United States Patent
Kato et al.

(10) Patent No.: US 9,781,715 B2
(45) Date of Patent: Oct. 3, 2017

(54) WIRELESS COMMUNICATION SYSTEM, BASE STATION DEVICE, TERMINAL DEVICE, WIRELESS COMMUNICATION METHOD, AND INTEGRATED CIRCUIT

(71) Applicant: Sharp Kabushiki Kaisha, Osaka-shi, Osaka (JP)

(72) Inventors: Yasuyuki Kato, Osaka (JP); Katsunari Uemura, Osaka (JP); Hidekazu Tsuboi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 8 days.

(21) Appl. No.: 14/773,771

(22) PCT Filed: Mar. 12, 2014

(86) PCT No.: PCT/JP2014/056480
§ 371 (c)(1),
(2) Date: Sep. 9, 2015

(87) PCT Pub. No.: WO2014/142167
PCT Pub. Date: Sep. 18, 2014

(65) Prior Publication Data
US 2016/0029375 A1    Jan. 28, 2016

(30) Foreign Application Priority Data
Mar. 13, 2013  (JP) .................................. 2013-049799

(51) Int. Cl.
*H04W 4/00* (2009.01)
*H04W 16/00* (2009.01)
(Continued)

(52) U.S. Cl.
CPC ....... *H04W 72/0426* (2013.01); *H04W 16/32* (2013.01); *H04W 74/0833* (2013.01);
(Continued)

(58) Field of Classification Search
CPC ......... H04W 72/0426; H04W 74/0833; H04W 76/048; H04W 16/32; H04W 88/02; H04W 92/20
See application file for complete search history.

(56) References Cited

U.S. PATENT DOCUMENTS

2010/0189071 A1*  7/2010  Kitazoe ............... H04W 74/002
                                              370/331
2012/0320791 A1* 12/2012  Guo .................. H04W 52/0212
                                              370/254
(Continued)

FOREIGN PATENT DOCUMENTS

EP    2 704 498 A1    3/2014
JP    2009-296024 A  12/2009
(Continued)

OTHER PUBLICATIONS

ETRI, "Considerations on Mobility Procedures for Scenario #2;" 3GPP TSG-RAN WG2 #82; R2-131875; May 20-24, 2013; 3 Pages.
(Continued)

*Primary Examiner* — Kiet Tang
(74) *Attorney, Agent, or Firm* — Keating & Bennett, LLP

(57) ABSTRACT

According to an aspect of the present invention, there is provided a wireless communication system that performs communication of a first base station device and a second base station device with a terminal device through a plurality of cells, in which the first base station device notifies the second base station device of a request message including information regarding whether or not a data path for user data of the terminal device has been changed, and the second base station device changes the data path for the user data of the terminal device, based on the information regarding whether or not the data path has been changed.

5 Claims, 13 Drawing Sheets

(51) Int. Cl.
  *H04W 36/00*  (2009.01)
  *H04W 72/04*  (2009.01)
  *H04W 16/32*  (2009.01)
  *H04W 74/08*  (2009.01)
  *H04W 76/04*  (2009.01)
  *H04W 92/20*  (2009.01)
  *H04W 88/02*  (2009.01)

(52) U.S. Cl.
  CPC .......... *H04W 76/048* (2013.01); *H04W 88/02* (2013.01); *H04W 92/20* (2013.01)

(56) References Cited

U.S. PATENT DOCUMENTS

| | | | |
|---|---|---|---|
| 2014/0051427 A1 | 2/2014 | Yamazaki et al. | |
| 2014/0362794 A1* | 12/2014 | Zhao | H04W 56/0045 370/329 |
| 2015/0264609 A1* | 9/2015 | Zhang | H04W 36/0055 455/436 |

FOREIGN PATENT DOCUMENTS

| | | |
|---|---|---|
| WO | 2012/082023 A1 | 6/2012 |
| WO | 2012/147884 A1 | 11/2012 |
| WO | 2012/166034 A1 | 12/2012 |

OTHER PUBLICATIONS

Nokia Corporation, et al., "Discussion on Detailed C-Plane Procedures;" 3GPP TSG-RAN WG2 Meeting #83bis; R2-133341; Oct. 7-11, 2013; 4 Pages.

Nokia Siemens Networks, et al.; "Data Split Options and Considerations on U-Plane Protocol Architecture for Dual-Connectivity;" 3GPP TSG-RAN WG2 Meeting #81bis; R2-131054; Apr. 15-19, 2013; 9 Pages.

Official Communication issued in International Patent Application No. PCT/JP2014/056480, mailed on Jun. 10, 2014.

"3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 10)," 3GPP TS 36.300 V10.8.0, Jun. 2012, pp. 1-194.

NTT Docomo, "Requirements, Candidate Solutions & Technology Roadmap for LTE Rel-12 Onward", RWS-120010, 3GPP Workshop on Release 12 and Onwards, Jun. 11-12, 2012, pp. 1-27.

Samsung, "Preliminary discussion on inter-ENB Carrier Aggregation", 3GPP TSG-RAN WG2 Meeting #81, R2-130614, Jan. 28-Feb. 1, 2013, 6 pages.

NTT DoCoMo, Inc., "Potential problem of handover procedure", 3GPP TSG RAN WG2 #62, Tdoc-R2-082622, May 5-9, 2008, 7 pages.

* cited by examiner

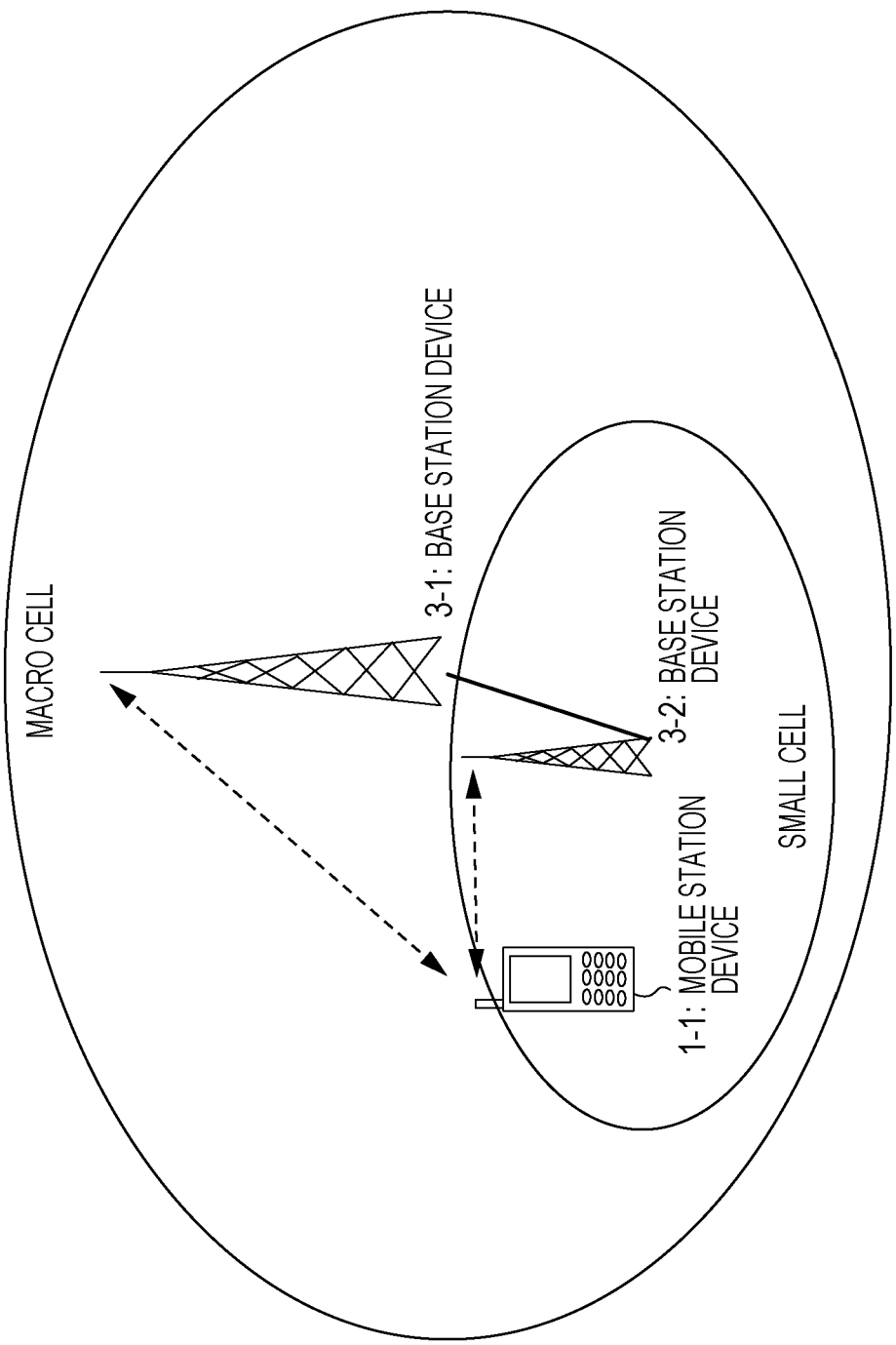

WIRELESS COMMUNICATION SYSTEM, BASE STATION DEVICE, TERMINAL DEVICE, WIRELESS COMMUNICATION METHOD, AND INTEGRATED CIRCUIT

TECHNICAL FIELD

The present invention relates to a wireless communication system, a base station device, and a terminal device, more particularly, to the wireless communication system, the base station device, the terminal device, a wireless communication method, and an integrated circuit which relate to transmission and reception control of data.

The present application claims priority to Japanese Patent Application No. 2013-049799 filed in Japan on Mar. 13, 2013, the contents of which are incorporated herein by reference.

BACKGROUND ART

In 3GPP (3rd Generation Partnership Project), the W-CDMA technology has been standardized as the third generation cellular mobile communication technology and a service has been provided. In addition, HSDPA having a further increased communication speed has also been standardized, and a service has been provided.

In 3GPP, evolution of the third generation radio access (Evolved Universal Terrestrial Radio Access, below referred to as "EUTRA") has been standardized and provision of a service has been started. As a communication scheme of a downlink in EUTRA, an orthogonal frequency division multiplexing (OFDM) scheme which has resistance to interference on multi-paths and is suitable for high-speed transmission has been employed. As a communication scheme of an uplink, a Discrete Fourier Transform (DFT)-spread OFDM scheme of single carrier-frequency division multiple access (SC-FDMA) which can reduce a peak to average power ratio (PAPR) of a transmitted signal has been employed in consideration of consumed power and cost in a mobile station device.

In 3GPP, a discussion of Advanced-EUTRA which corresponds to further evolution of EUTRA has also been started. In Advanced-EUTRA, it is assumed that a frequency band up to the maximum 100 MHz bandwidth is used in an uplink and in a downlink, and a communication having the maximum transmission rate which is equal to or greater than 1 Gbps in the downlink and is equal to or greater than 500 Mbps in the uplink is performed.

In Advanced-EUTRA, it is considered that a frequency band of the maximum 100 MHz is realized by bundling a plurality of frequency bands which are compatible with EUTRA such that a mobile station device for EUTRA can be also handled. In Advanced-EUTRA, one frequency band of equal to or less than 20 MHz in EUTRA is also referred to as a component carrier (CC). The component carrier is also referred to as a cell. Bundling frequency bands of equal to or less than 20 MHz is referred to as carrier aggregation (CA) (NPL 1).

In Advanced-EUTRA, performing of carrier aggregation of a macro cell and a small cell which is in a range of the macro cell is examined. Being in a range of the macro cell includes a case of different frequencies. In NPL 2, it is proposed that control information (control plane information) is transmitted from a macro cell and user information (user plane information) is transmitted from a small cell in a communication between a base station device and a mobile station device during carrier aggregation of the macro cell and the small cell. Carrier aggregation of the macro cell and the small cell disclosed in NPL 2 is also referred to as dual connect.

CITATION LIST

Non-Patent Document

NPL 1: 3GPP TS (Technical Specification) 36.300, V10.8.0 (2012-06), Evolved Universal Terrestrial Radio Access (E-UTRA) and Evolved Universal Terrestrial Radio Access Network (E-UTRAN), Overall description Stage2

NPL 2: RWS-120010, NTT DOCOMO, "Requirements, Candidate Solutions & Technology Roadmap for LTE Rel-12 Onward", 3GPP Workshop on Release 12 and onward, Ljubljana, Slovenia, 11-12 Jun. 2012

DISCLOSURE OF THE INVENTION

Problems to be Solved by the Invention

However, in the communication between a base station device and a mobile station device as disclosed in NPL 2, when control information is transmitted and received between the base station device and the mobile station device of a macro cell and user information is transmitted and received between the base station device and the mobile station device of a small cell, control of transmitting the control information and the user information to appropriate cells is required. In order to perform dual connect, switching procedures of data transmission and reception control with the mobile station device between the base station device of the macro cell and the base station device of the small cell are required.

Considering such circumstances, an object of an aspect of the present invention is to provide a mobile station device, a base station device, a wireless communication system, a wireless communication method, and an integrated circuit that enable appropriate switching of data transmission and reception control between a base station device of a macro cell and a base station device of a small cell, and between the base station device and the mobile station device.

Means for Solving the Problems (1) In order to achieve the above-described object, the present invention provides the following means. According to an aspect of the present invention, there is provided a wireless communication system in which a first base station device and a second base station device communicate with a terminal device through a plurality of cells. The first base station device notifies the second base station device of a request message including information regarding whether or not a data path for user data of the terminal device has been changed, and the second base station device changes the data path for the user data of the terminal device, based on the information regarding whether or not the data path has been changed.

(2) In the wireless communication system according to the aspect of the present invention, the second base station device may do not change the data path in a case where a random accel preamble transmitted from the terminal device is not received.

(3) In the wireless communication system according to the aspect of the present invention, the request message may include a discontinuous reception parameter.

(4) According to another aspect of the present invention, there is provided a base station device that communicates with a terminal device, in which the base station device transmits a request message including information regarding whether or not a data path for user data of the terminal device has been changed, to a base station device of a cell which is to be added, receives a request response message which is a response to the request message from the base station device of the cell which is to be added, and transmits a configuration message including information regarding data transmission control of the cell which is to be added to the terminal device.

(5) According to yet another aspect of the present invention, there is provided a base station device that communicates with a terminal device, in which the base station device receives a request message including information regarding whether or not a data path for user data of the terminal device has been changed, from another base station device and changes the data path for the user data of the terminal device based on the information regarding whether or not the data path has been changed.

(6) According to yet another aspect of the present invention, there is provided a terminal device that communicates with a first base station device and a second base station device through a plurality of cells, through which the terminal device receives a configuration message from the first base station device, the configuration message including information regarding data transmission control of the first base station device and the second base station device, transmits a random access preamble to the second base station device after the configuration message is received, and starts data transmission control based on the information regarding the data transmission control in a case where a random access response message which is a response to the random access preamble is received from the second base station device.

(7) According to yet another aspect of the present invention, there is provided a wireless communication method of a base station device that communicates with a terminal device, the method including: a step of transmitting a request message including information regarding whether or not a data path for user data of the terminal device has been changed, to a base station device of a cell which is to be added; a step of receiving a request response message which is a response to the request message from the base station device of a cell which is to be added; and a step of transmitting a configuration message including information regarding data transmission control to the terminal device.

(8) According to yet another aspect of the present invention, there is provided a wireless communication method of a base station device that communicates with a terminal device, the method including: a step of receiving a request message including information regarding whether or not a data path for user data of the terminal device has been changed, from another base station device; and a step of changing the data path for the user data of the terminal device based on the information regarding whether or not the data path has been changed.

(9) According to yet another aspect of the present invention, there is provided a wireless communication method of a terminal device that communicates with a first base station device and a second base station device through a plurality of cells, the method including: a step of receiving a configuration message from the first base station device, the configuration message including information regarding data transmission control of the first base station device and the second base station device; a step of transmitting a random access preamble to the second base station device after the configuration message is received; and a step of starting data transmission control based on the information regarding the data transmission control in a case where a random access response message which is a response to the random access preamble is received from the second base station device.

(10) According to yet another aspect of the present invention, there is provided an integrated circuit that is applied to a base station device communicating with a terminal device, the circuit including: means for transmitting a request message including information regarding whether or not a data path for user data of the terminal device has been changed to a base station device of a cell which is to be added; means for receiving a request response message which is a response to the request message from the base station device of a cell which is to be added; and means for transmitting a configuration message to the terminal device, the configuration message including information regarding data transmission control of the cell which is to be added.

(11) According to yet another aspect of the present invention, there is provided an integrated circuit that is applied to a base station device communicating with a terminal device, the circuit including: means for receiving a request message including information regarding whether or not a data path for user data of the terminal device has been changed from another base station device; and means for changing the data path for the user data of the terminal device based on the information regarding whether or not the data path has been changed.

(12) According to yet another aspect of the present invention, there is provided an integrated circuit that is applied to a terminal device which communicates with a first base station device and a second base station device through a plurality of cells, the circuit including: means for receiving a configuration message from the first base station device, the configuration message including information regarding data transmission control of the first base station device and the second base station device; means for transmitting a random access preamble to the second base station device after the configuration message is received; and means for starting data transmission control based on the information regarding the data transmission control in a case where a random access response message which is a response to the random access preamble is received from the second base station device.

Effects of the Invention

According to the present invention, it is possible to switch data transmission and reception control between the base station device of the macro cell and the mobile station device or between the base station device of the small cell and the mobile station device with high efficiency.

BRIEF DESCRIPTION OF THE DRAWINGS

FIG. 15 is a diagram illustrating an example of dual connect.

MODE FOR CARRYING OUT THE INVENTION

An OFDM scheme is employed for a downlink of EUTRA. A single carrier communication method of a DFT-spread OFDM scheme is employed for an uplink of EUTRA.

Figure 7:
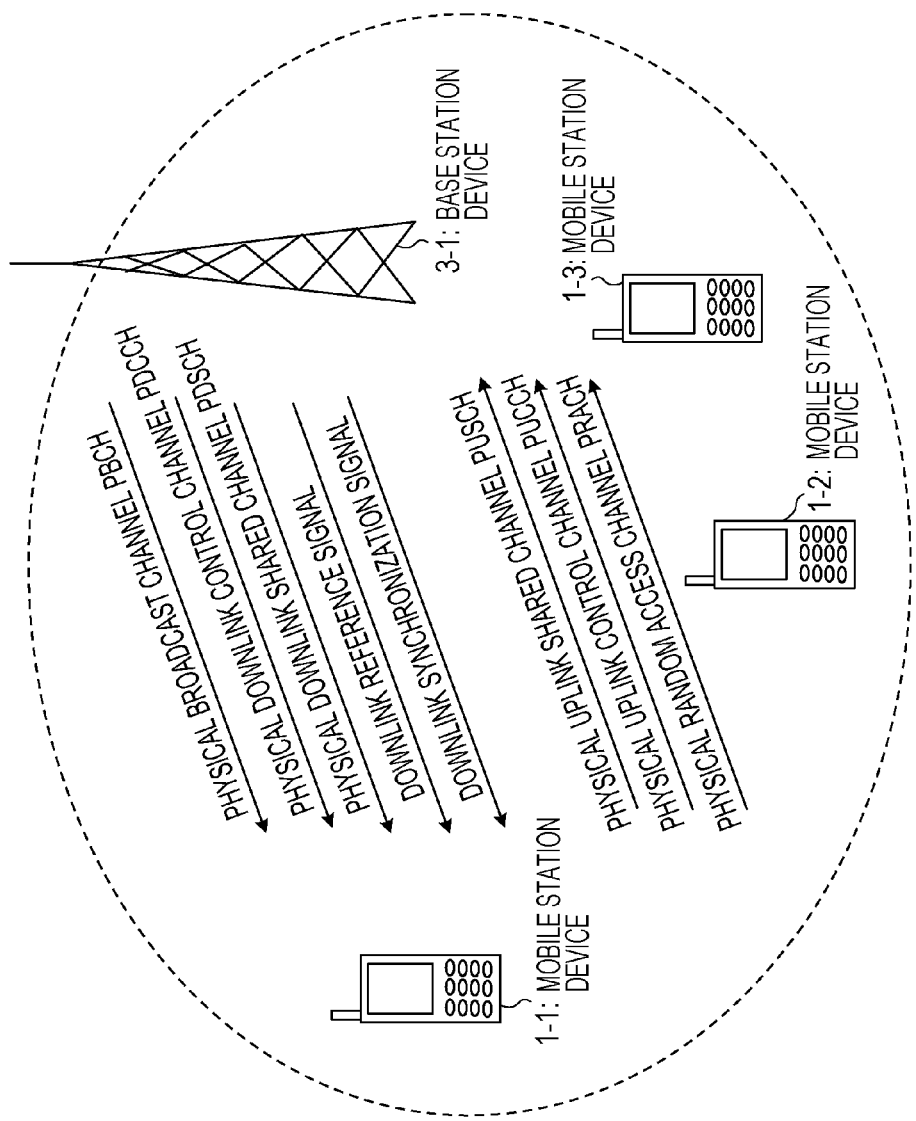
FIG. 7 is a diagram illustrating an example of a physical channel structure in an EUTRA.

FIG. 7 is a diagram illustrating a physical channel structure of EUTRA. A physical downlink shared channel PDSCH, a physical downlink control channel PDCCH, and a physical broadcast channel PBCH constitute a physical channel of a downlink. In addition, physical signals of a downlink synchronization signal and a downlink reference signal are included (NPL 1).

A physical random access channel PRACH, a physical uplink shared channel PUSCH, and a physical uplink control channel PUCCH constitute a physical channel of an uplink (NPL 1).

Figure 8:
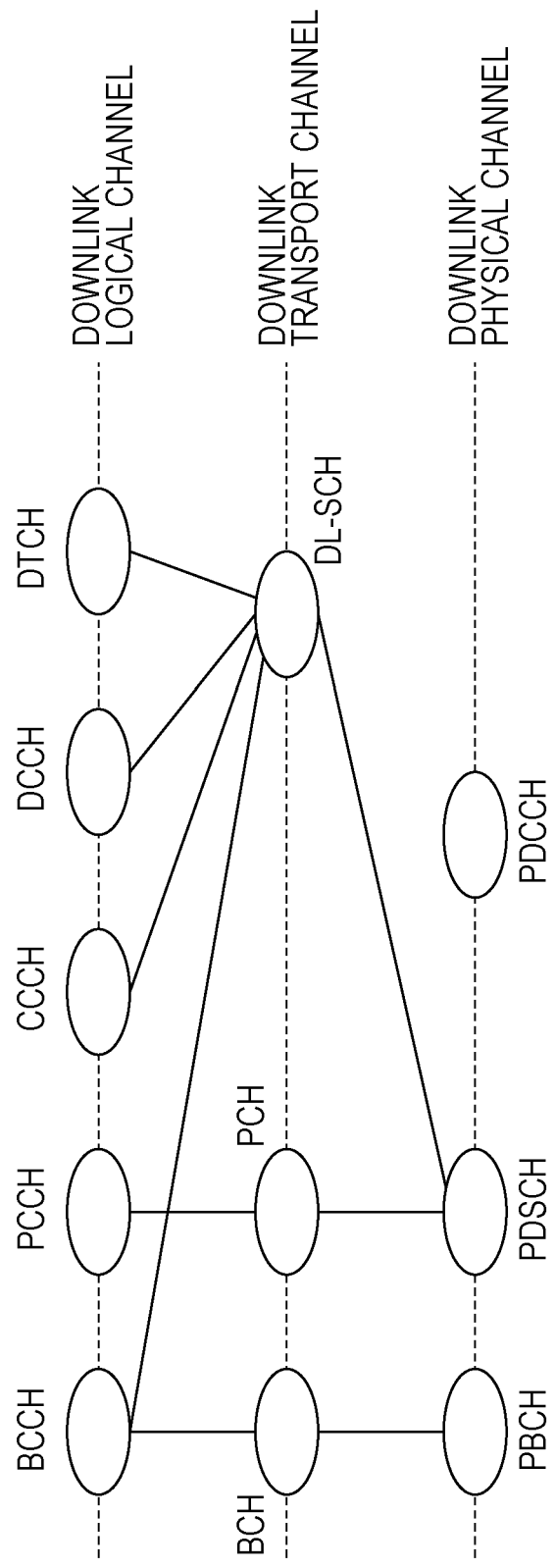
FIG. 8 is a diagram illustrating an example of a channel structure of a downlink in EUTRA.

FIG. 8 is a diagram illustrating a channel structure of a downlink of EUTRA. Each of the channels of the downlink illustrated in FIG. 8 is constituted by a logical channel, a transport channel, and a physical channel. The logical channel defines a type of data transmission service which is transmitted and received in a medium access control (MAC) layer. The transport channel defines characteristics of data transmitted in a radio interface and a method of transmitting the data. The physical channel is a channel which causes data transmitted to a physical layer on the transport channel to be carried, and is physical.

The logical channel of the downlink includes a broadcast control channel BCCH, a paging control channel PCCH, a common control channel CCCH, a dedicated control channel DCCH, and a dedicated traffic channel DTCH.

The transport channel of the downlink includes a broadcast channel BCH, a paging channel PCH, and a downlink shared channel DL-SCH.

The physical channel of the downlink includes a physical broadcast channel PBCH, a physical downlink control channel PDCCH, and a physical downlink shared channel PDSCH. These channels are transmitted and received between a base station device and a mobile station device.

Next, the logical channel will be described. The broadcast control channel BCCH is a downlink channel used for broadcasting system control information. The paging control channel PCCH is a downlink channel which is used for transmitting paging information, and is used when a network does not know a location of a cell of the mobile station device. The common control channel CCCH is a channel used for transmitting control information between a mobile station device and the network and is used by a mobile station device which does not have a radio resource control (RRC) connection with the network.

The dedicated control channel DCCH is a point-to-point bidirectional channel and is a channel used for transmitting individual control information between a mobile station device and the network. The dedicated control channel DCCH is used by a mobile station device having RRC connection. The dedicated traffic channel DTCH is a point-to-point bidirectional channel and is a dedicated channel for one mobile station device. The dedicated traffic channel DTCH is used for transmitting user information (unicast data).

Next, the transport channel will be described. The broadcast channel BCH is broadcast to the entirety of a cell by using a transmission format which is defined to be fixed in advance. A hybrid automatic repeat request (HARQ), dynamic adaptive radio link control, discontinuous reception (DRX) are supported in the downlink shared channel DL-SCH, and the downlink shared channel DL-SCH is required to be broadcast to the entirety of a cell.

DRX is supported in the paging channel PCH, and the paging channel PCH is required to be broadcast to the entirety of a cell. The paging channel PCH is mapped onto physical resources which are dynamically used for the traffic channel or other control channels, that is, onto the physical downlink shared channel PDSCH.

Next, the physical channel will be described. The physical broadcast channel PBCH is mapped onto the broadcast channel BCH at a period of 40 milliseconds. The physical downlink control channel PDCCH is a channel which performs resource allocation for the downlink shared channel PDSCH and notifies a mobile station device of hybrid automatic repeat request (HARQ) information for downlink data, and an uplink transmission grant (uplink grant) which corresponds to resource allocation of the physical uplink shared channel PUSCH. The physical downlink shared channel PDSCH is a channel used for transmitting the downlink data or the paging information.

Next, channel mapping will be described. As illustrated in FIG. 8, mapping of the transport channel and the physical channel is performed in the downlink as follows. The broadcast channel BCH is mapped onto the physical broadcast channel PBCH. The paging channel PCH and the downlink shared channel DL-SCH are mapped onto the physical downlink shared channel PDSCH. The physical downlink control channel PDCCH is used only for the physical channel.

Mapping of the logical channel and the transport channel is performed in the downlink as follows. The paging control channel PCCH is mapped onto the paging channel PCH. The broadcast control channel BCCH is mapped onto the broadcast channel BCH and the downlink shared channel DL-SCH. The common control channel CCCH, the dedicated control channel DCCH, and the dedicated traffic channel DTCH are mapped onto the downlink shared channel DL-SCH.

Figure 9:
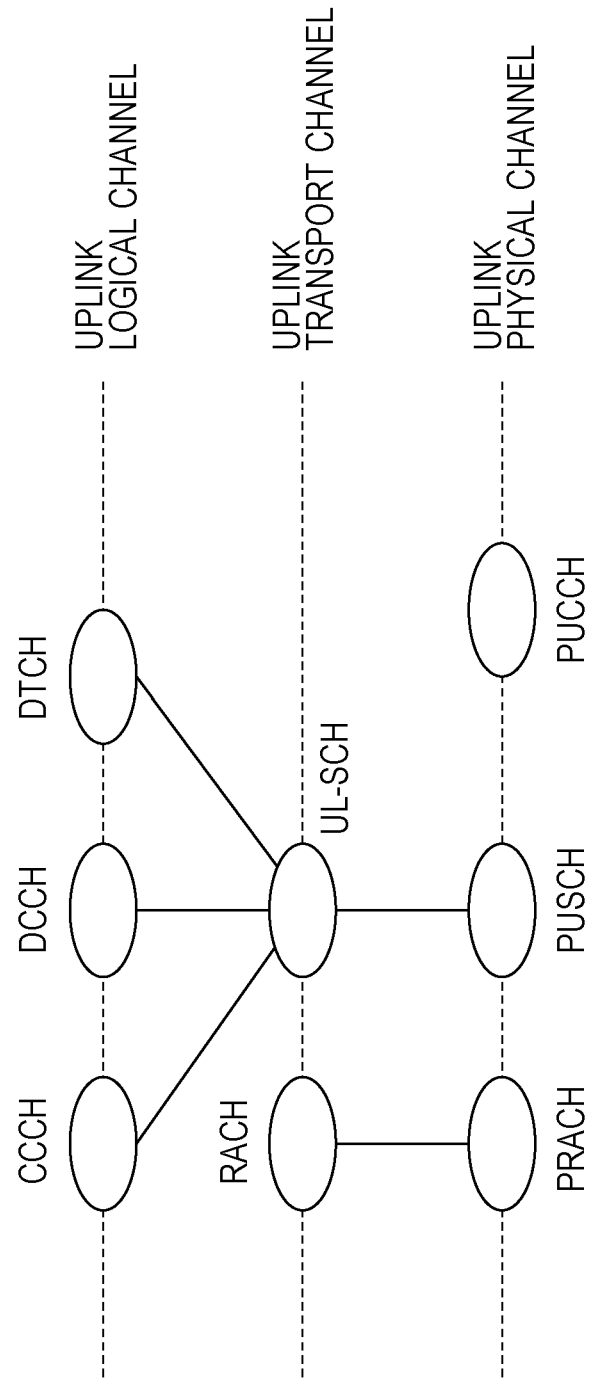
FIG. 9 is a diagram illustrating an example of a channel structure of an uplink in EUTRA.

FIG. 9 is a diagram illustrating a channel structure of the uplink in EUTRA. Each of channels of the uplink illustrated in FIG. 9 is constituted by a logical channel, a transport channel, and a physical channel. The definition of each channel is the same as that of the channel of the downlink.

The logical channel of the uplink includes a common control channel CCCH, a dedicated control channel DCCH, and a dedicated traffic channel DTCH.

The transport channel of the uplink includes an uplink shared channel UL-SCH and a random access channel RACH.

The physical channel of the uplink includes a physical uplink control channel PUCCH, a physical uplink shared channel PUSCH, and a physical random access channel PRACH. These channels are transmitted and received between a base station device and a mobile station device. The physical random access channel PRACH is used mainly in random access preamble transmission which is performed for acquiring transmission timing information, from a mobile station device to a base station device. The random access preamble transmission is performed in a random access procedure.

Next, the logical channel will be described. The common control channel CCCH is a channel used for transmitting control information between a mobile station device and a network. The common control channel CCCH is used by a mobile station device which does not have a radio resource control (RRC) connection with the network.

The dedicated control channel DCCH is a point-to-point bidirectional channel and is a channel used for transmitting individual control information between a mobile station device and the network. The dedicated control channel DCCH is used by a mobile station device having an RRC connection. The dedicated traffic channel DTCH is a point-to-point bidirectional channel and is a dedicated channel for one mobile station device. The dedicated traffic channel DTCH is used for transmitting user information (unicast data).

Next, the transport channel will be described. A hybrid automatic repeat request (HARQ), dynamic adaptive radio link control, and discontinuous transmission (DTX) are supported in the uplink shared channel UL-SCH. Limited control information is transmitted in the random access channel RACH.

Next, the physical channel will be described. The physical uplink control channel PUCCH is a channel used for notifying a base station device of response information (ACK/NACK) for downlink data, of radio quality information of the downlink, and a request (Scheduling Request: SR) for transmission of uplink data. The physical uplink shared channel PUSCH is a channel used for transmitting the uplink data. The physical random access channel is a channel used for transmitting a random access preamble.

Next, channel mapping will be described. As illustrated in FIG. 9, mapping of the transport channel and the physical channel is performed in the uplink as follows. The uplink shared channel UL-SCH is mapped onto the physical uplink shared channel PUSCH. The random access channel RACH is mapped onto the physical random access channel PRACH. The physical uplink control channel PUCCH is used only for the physical channel.

Mapping of the logical channel and the transport channel is performed in the uplink as follows. The common control channel CCCH, the dedicated control channel DCCH, and the dedicated traffic channel DTCH are mapped onto the uplink shared channel UL-SCH.

Figure 10:
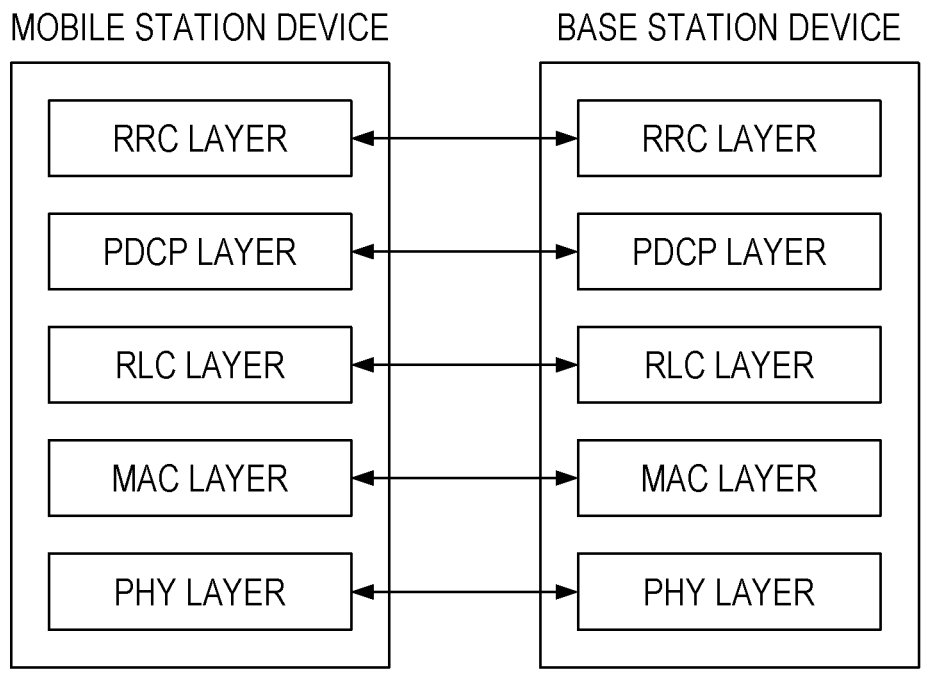
FIG. 10 is a diagram illustrating an example of a structure of a communication protocol relating to control information of the base station device and the mobile station device.
Figure 11:
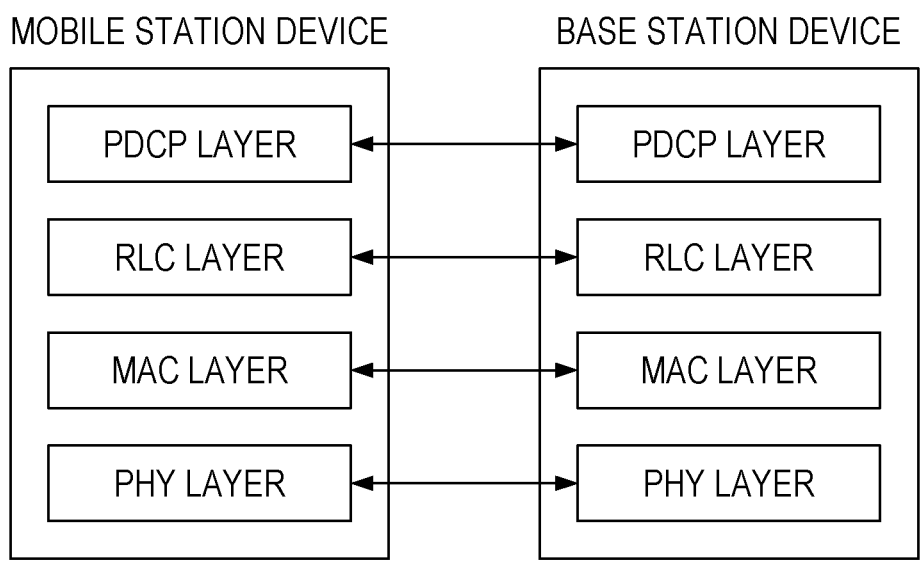
FIG. 11 is a diagram illustrating an example of a structure of a communication protocol relating to user information of the base station device and the mobile station device.

FIG. 10 illustrates a protocol stack for handling control data of a mobile station device and a base station device in EUTRA. FIG. 11 illustrates a protocol stack for handling user data of a mobile station device and a base station device in EUTRA. Descriptions regarding FIGS. 10 and 11 will be made below.

A physical layer (PHY layer) uses the physical channel and provides a higher layer to a transmission service. The PHY layer is connected to a higher medium access control layer (MAC layer) by using the transport channel. Data moves between layers, that is, between the MAC layer and the PHY layer through the transport channel. Data is transmitted and received between a PHY layer of the mobile station device and a PHY layer of the base station device through the physical channel.

The MAC layer maps various logical channels onto various transport channels. The MAC layer is connected to a higher radio link control layer (RLC layer) by using the logical channel. The logical channel is classified much in accordance with a type of transmitted information, and is classified into the control channel which transmits the control information and the traffic channel which transmits the user information. The MAC layer has a function to control the PHY layer for performing discontinuous reception and transmission (DRX. DTX), a function to perform notification of information on transmission power, and a function to control HARQ.

The RLC layer performs segmentation and concatenation on data received from the higher layer and adjusts data size so as to allow a lower layer to appropriately transmit data. The RLC layer has a function to guarantee quality of service (QoS) required for data. That is, the RLC layer has a function of retransmission control and the like of data.

A packet data convergence protocol layer (PDCP layer) has a function of header compression in which unnecessary control information is compressed in order to efficiently transmit an IP packet which is the user data for radio section. The PDCP layer has a function to encrypt data.

The radio resource control layer (RRC layer) is defined only by the control information. The RRC layer configures and reconfigures a radio bearer (RB) and controls the logical channel, the transport channel, and the physical channel. The RB is classified into a signaling radio bearer (SRB) and a data radio bearer (DRB). The SRB is used as a path for transmitting a RRC message which is the control information. The DRB is used as a path for transmitting the user information. The RB is configured between the RRC layer of a base station device and the RRC layer of the mobile station device.

The PHY layer corresponds to a physical layer which is a first layer in the hierarchical structure of the open systems interconnection (OSI) model which is generally known. The MAC layer, the RLC layer, and the PDCP layer correspond to a data link layer which is a second layer in the OSI model. The RRC layer corresponds to a network layer which is a third layer in the OSI model.

The random access procedure will be described below. The random access procedure includes two access procedures which are a contention based random access procedure and a non-contention based random access procedure (NPL 1).

Figure 12:
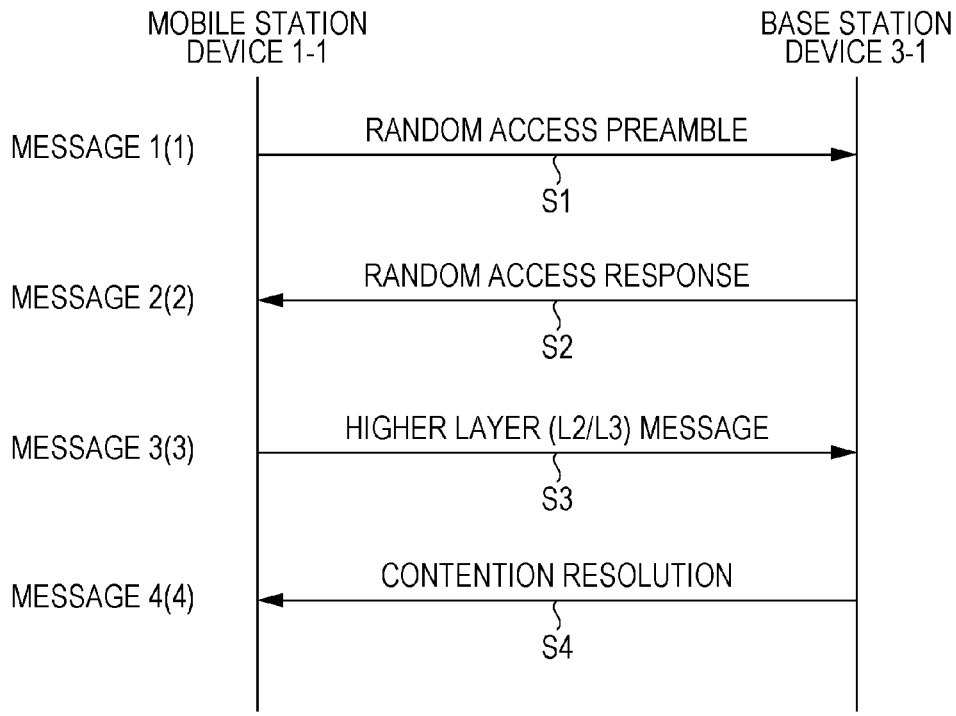
FIG. 12 is a diagram illustrating an example of a contention based random access procedure.

FIG. 12 is a diagram illustrating processes of the contention based random access procedure. The contention based random access procedure is a random access procedure having a probability of a collision between mobile station devices and is performed at a time of an initial access in a state where a connection (communication) with a base station device is not performed, or at a time of a scheduling request and the like when uplink data is transmitted to a mobile station device when the mobile station device is connected to the base station device, but in a state where uplink synchronization is lost.

Figure 13:
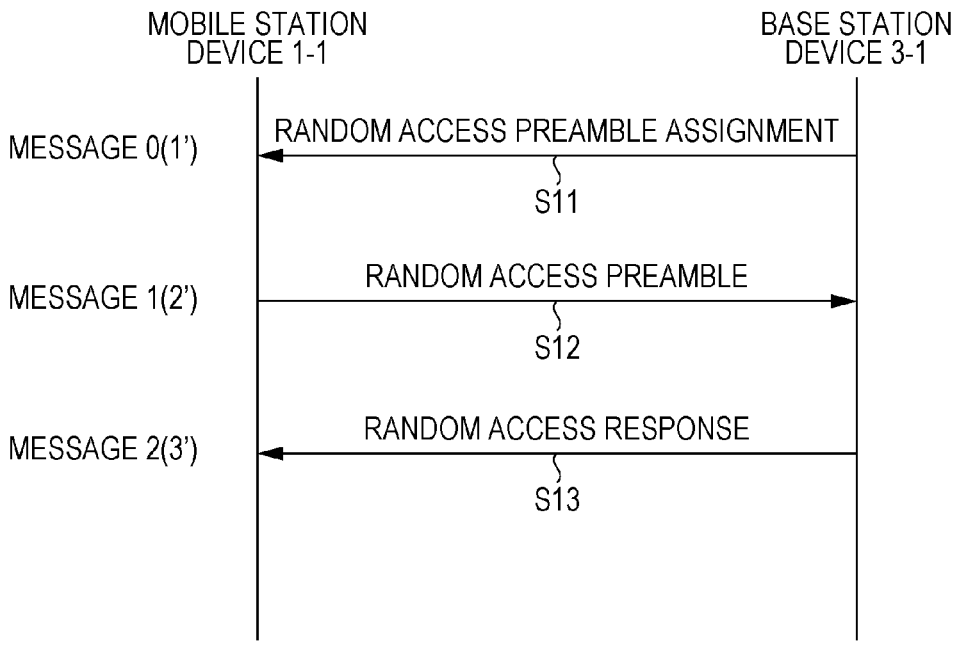
FIG. 13 is a diagram illustrating an example of a non-contention based random access procedure.

FIG. 13 is a diagram illustrating the non-contention based random access procedure. The non-contention based random access procedure is a random access procedure in which a collision between mobile station devices does not occur. A mobile station device starts this random access procedure in accordance with an instruction from a base station device in a special case, for example, in a case of handover, or in a case where a transmission timing of the mobile station device is not efficient, such that uplink synchronization between the mobile station device and the base station device is rapidly performed in a case where uplink synchronization is lost in a connection of the base station device and the mobile station device. The non-contention based random access procedure is instructed by a message of the RRC (Radio Resource Control: Layer 3) and control data of the physical downlink control channel PDCCH.

The contention based random access procedure will be simply described using FIG. 12. At first, a mobile station device 1-1 transmits a random access preamble to a base station device 3-1 (message 1: (1), Step S1). The base station device 3-1 which has received the random access preamble transmits a response (random access response) to the random access preamble to the mobile station device 1-1 (message 2: (2), Step S2). The mobile station device 1-1 transmits a message of a higher layer (Layer 2/Layer 3) based on scheduling information included in the random access response (message 3: (3), Step S3). The base station device 3-1 transmits a collision check message to the mobile station device 1-1 which enables the higher layer message of (3) to be received (message 4: (4), Step S4). The contention based random access is also referred to as transmission of a random preamble.

The non-contention based random access procedure will be simply described using FIG. 13. At first, the base station device 3-1 notifies the mobile station device 1-1 of a preamble number (or sequence number) and a random access channel number which is to be used (message 0: (1)', Step S11). The mobile station device 1-1 transmits a random access preamble of a preamble number which is set to the random access channel RACH which is set (message 1: (2)', Step S12). The base station device 3-1 which has received the random access preamble transmits a response (random access response) to the random access preamble to the mobile station device 1-1 (message 2: (3)', Step S13). However, the contention based random access procedure is performed in a case where a value of the notified preamble number is 0. The non-contention based random access procedure is also referred to as dedicated preamble transmission.

Figure 14:
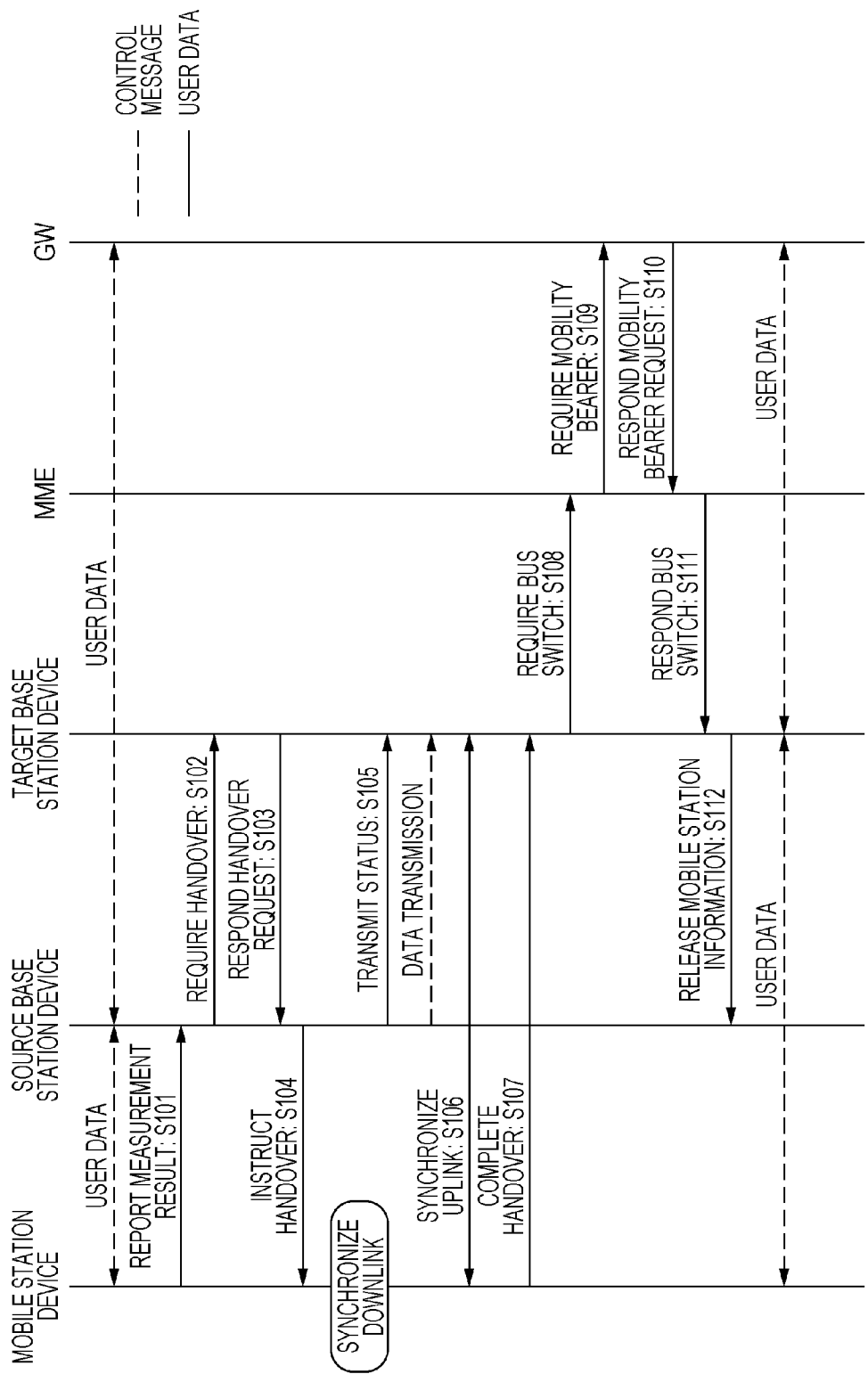
FIG. 14 is a diagram illustrating an example of a handover procedure.

Next, a handover procedure will be described using FIG. 14. A base station device which corresponds to a handover source is described below as a source base station device, and a base station device which corresponds to a handover destination is described below as a target base station device. The mobile station device measures radio quality of peripheral cells of a serving frequency and a peripheral frequency and notifies the source base station device of a measurement report message including a radio quality measurement result (Step S101). The source base station device determines whether or not the handover is to be performed based on a measurement result from the mobile station device. The source base station device determines a target base station device corresponding to the handover destination, and notifies the target base station device corresponding to the handover destination, of a handover request message in a case where the handover is to be performed (Step S102).

The handover request message includes information necessary for the handover in the target base station device. The information necessary for the handover includes information of the mobile station device which includes C-RNTI of a RRC layer level in the source base station device, information of the mobile station device, which is in a higher layer level than the RRC layer, encryption key information, an MAC address of the mobile station device, and the like.

If the target base station device which corresponds to the handover destination consent to the handover, the target base station device notifies the source base station device which corresponds to the handover source of a handover request response message (Step S103). The handover request response message includes radio parameters of a cell of the target base station device, and information which is allocated to the mobile station device by the target base station device. The allocated information includes radio resource information of the uplink, preamble information for performing the random access procedure at a time of the handover, new C-RNTI for the mobile station device, and information regarding an encryption key.

If the source base station device receives the handover request response message, the source base station device notifies the mobile station device to a handover instruction message (Step S104). The handover instruction message includes radio parameters of the cell of the target base station device which is included in the handover request response message, and information which is allocated to the mobile station device by the target base station device.

After notification of the handover instruction message, the source base station device notifies the target base station device of a status transmission message including user data information of the mobile station device (Step S105). User data of the mobile station device held by the source base station device is transmitted to the target base station device. If the mobile station device receives the handover instruction message, the mobile station device performs downlink synchronization with the target base station device. If the mobile station device completes the downlink synchronization, the mobile station device performs the random access procedure in order to have synchronization of the uplink with the target base station device (Step S106). If the mobile station device receives the random access response message from the target base station device and acquires a uplink transmission timing for uplink synchronization, the mobile station device notifies the target base station device of a handover completion message (Step S107).

If the target base station device receives the handover completion message, the target base station device notifies a mobility management entity (MME) of a path switch request message for requiring to change a data path from the source base station device to the target base station device due to a change of base station device to which the mobile station device has been connected (Step S108). If the MME receives the path switch request message, the MME notifies a gateway (GW) of a mobility bearer request message (Step S109).

If the GW receives the mobility bearer request message, the GW switches the data path of the mobile station device for user data from the source base station device to the target base station device. The GW notifies the MME of a mobility bearer request response message (Step S110). The MME notifies the target base station device of a path switch request response message (Step S111). If the target base station device receives the path switch request response message, the target base station device notifies the source base station device of a mobile station information release message for instructing release of information on the mobile station device (Step S112). If the source base station device receives the mobile station information release message, the source base station device deletes information on the mobile station device which is subjected to handover with the target base station device.

In 3GPP, a discussion of Advanced-EUTRA which corresponds to more evolution of EUTRA has also been performed. In Advanced-EUTRA, it is assumed that a frequency band up to the maximum 100 MHz bandwidth is used in an uplink and in a downlink, and a communication having the maximum transmission rate which is equal to or greater than 1 Gbps in the downlink and is equal to or greater than 500 Mbps in the uplink is performed.

In Advanced-EUTRA, it is considered that a frequency band of the maximum 100 MHz is realized by bundling a plurality of frequency bands which are equal to or less than 20 MHz in EUTRA such that a mobile station device for EUTRA can be also handled. In Advanced-EUTRA, one frequency band of equal to or less than 20 MHz in EURTA is also referred to as a component carrier (CC) (NPL 1). Combination of one downlink component carrier and one uplink component carrier constitutes one cell. Only one downlink component carrier may constitute one cell.

The base station device allocates a plurality of cells relating to communication performance or communication conditions of the mobile station device, and communicates with the mobile station device through the allocated plurality of cells. The plurality of cells which are allocated to the mobile station device is classified such that one cell is set as a primary cell (PCell) and other cells are set as secondary cells (SCell). A special function such as allocation of the physical uplink control channel PUCCH is set in the primary cell.

In order to reduce consumed power of the mobile station device, the mobile station device does not perform reception processing of the downlink on the secondary cells just after allocation (or does not perform reception processing in accordance with radio resource allocation information instructed through the physical downlink control channel PDCCH). After activation is instructed from the base station device, the mobile station device starts to perform reception processing of the downlink on the secondary cell which receives an instruction of activation (or perform reception processing in accordance with the radio resource allocation information instructed through the physical downlink control channel PDCCH).

After deactivation is instructed to the activated secondary cell from the base station device, the mobile station device stops performing the reception processing of the downlink on the secondary cell which receives an instruction of deactivation (or performing the reception processing in non-accordance with the radio resource allocation information instructed through the physical downlink control channel PDCCH). The secondary cell that receives an instruction of activation from the base station device and performs reception processing of the downlink is referred to as an activated cell. The secondary cell just after allocation to the mobile station device by the base station device, and the secondary cell which receives an instruction of deactivation from the base station device and stops the reception processing of the downlink are referred to as a deactivated cell. The primary cell normally corresponds to the activated cell.

The MAC layer of the mobile station device has a function to control the PHY layer so as to perform activation/deactivation of the cell and a function to control the PHY layer so as to manage a transmission timing of the uplink, in a case where carrier aggregation is performed.

It is examined as illustrated in FIG. 15 that the mobile station device communicates with both two base station devices simultaneously with performing of dual connect with the two base station devices. In the dual connect, it is assumed that the mobile station device connects a base station device of a macro cell with a base station device of a small cell, and the mobile station device and both of the base station devices perform data transmission and reception through the a plurality of cells when a connection between the base station device of the macro cell and the base station device of the small cell is performed by using a low speed backbone line which has a delay, not a high speed backbone line (also referred to as backhaul) such as an optical fiber, which is considered to have no delay.

In the dual connect, the macro cell is set as the primary cell (PCell), the small cell is set as the secondary cell (SCell). Carrier aggregation is performed and communication between the mobile station device and the base station device is performed. In the dual connect, it is assumed that transmission and reception of control data is performed between the base station device and the mobile station device of the macro cell, and transmission and reception of user data is performed between the base station device and the mobile station device of the small cell. Additionally, it is considered that the base station device that is to perform transmission and reception of data is changed based on types of data (for example, QoS, logical channel, or the like) more detail than types of the control data and the user data.

EMBODIMENT

[Description of Structure]

Figure 1:
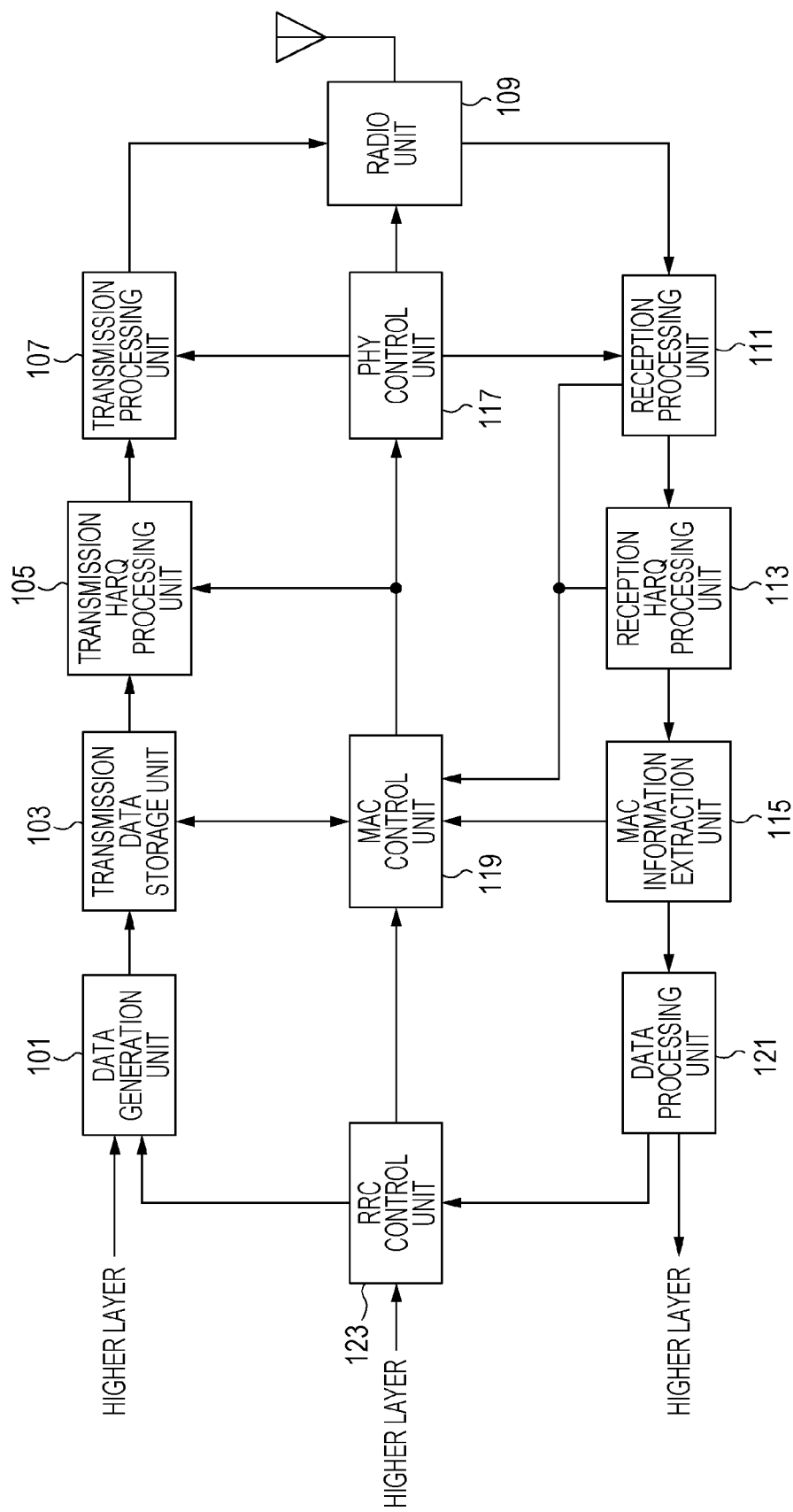
FIG. 1 is a diagram illustrating an example of a structure of a mobile station device according to an embodiment of the present invention.

FIG. 1 is a diagram illustrating a structure of the mobile station device according to an embodiment of the present invention. A data generation unit 101, a transmission data storage unit 103, a transmission HARQ processing unit 105, a transmission processing unit 107, a radio unit 109, a reception processing unit 111, a reception HARQ processing unit 113, an MAC information extraction unit 115, a PHY control unit 117, an MAC control unit 119, a data processing unit 121, and an RRC control unit 123 constitute each of mobile station devices 1-1 to 1-3.

User data from a higher layer and control data from the RRC control unit 123 are input to the data generation unit 101. The data generation unit 101 has functions as the PDCP layer and the RLC layer. The data generation unit 101 performs processing such as header compression of an IP packet of the user data, encryption of data, and segmentation and association of data. The data generation unit 101 adjusts a data size. The data generation unit 101 outputs data subjected to processing to the transmission data storage unit 103.

The transmission data storage unit 103 accumulates pieces of data input from the data generation unit 101, and output data which is instructed based on an instruction from the MAC control unit 119 and has an instructed data amount, to the transmission HARQ processing unit 105. The transmission data storage unit 103 outputs information on a data amount of accumulated pieces of data to the MAC control unit 119.

The transmission HARQ processing unit 105 codes input data and performs puncturing processing on coded data. The transmission HARQ processing unit 105 outputs punctured data to the transmission processing unit 107, and holds coded data. The transmission HARQ processing unit 105 performs puncturing processing different from puncturing which was performed the previous time based on coded data which is held, in a case where retransmission of data is instructed from the MAC control unit 119. The transmission HARQ processing unit 105 outputs punctured data to the transmission processing unit 107.

The transmission processing unit 107 modulates and codes data input from the transmission HARQ processing unit 105. The transmission processing unit 107 performs Discrete Fourier Transform (DFT)-Inverse Fast Fourier Transform (IFFT) processing on the modulated and coded data. The transmission processing unit 107 inserts a cyclic prefix (CP) into the data after the DFT-IFET processing, maps the data after CP insertion onto the physical uplink shared channel (PUSCH) of each component carrier (cell) of the uplink, and outputs a result of mapping to the radio unit 109.

The transmission processing unit 107 generates an ACK or a NACK signal, maps the generated signal onto the physical uplink control channel (PUCCH), and outputs a result of mapping to the radio unit 109 in a case where a response instruction of reception data is received from the PHY control unit 117. The transmission processing unit 107 generates a random access preamble, maps the generated random access preamble onto the physical random access channel (PRACH), and output a result of mapping to the radio unit 109 in a case where a transmission instruction of the random access preamble is received from the PHY control unit 117.

The radio unit 109 upconverts data input from the transmission processing unit 107 into a radio frequency of transmission location information (transmission cell information) which is instructed from the PHY control unit 117, adjusts transmission power, and thus transmits data from a transmit antenna. The radio unit 109 downconverts a radio signal received by a receive antenna, and output the downconverted radio signal to the reception processing unit 111.

The reception processing unit 111 performs Fast Fourier Transform (FFT) processing, decoding, demodulation processing, and the like on a signal input from the radio unit 109. The reception processing unit 111 outputs data of the physical downlink shared channel (PDSCH) in the demodulated data to the reception HARQ processing unit 113. The reception processing unit 111 outputs response information (ACK/NACK) and uplink transmission grant information (Uplink grant) of uplink transmission data of control data which is acquired from the physical downlink control channel PDCCH in the demodulated data, to the MAC control unit 119. The uplink transmission grant information includes data modulation•coding techniques, data size information, HARQ information, transmission location information, and the like.

The reception HARQ processing unit 113 outputs data to the MAC information extraction unit 115 in a case where decoding processing is performed on input data from the reception processing unit 111, and the decoding processing succeeds. The reception HARQ processing unit 113 holds data which fails in the decoding processing, in a case where the decoding processing on the input data fails. The reception HARQ processing unit 113 combines data which has been held and retransmission data in a case of receiving the retransmission data, and performs decoding processing on a result of combination. The reception HARQ processing unit 113 notifies the MAC control unit 119 of which the decoding processing on the input data succeeds or fails.

The MAC information extraction unit 115 extracts control data of the MAC layer (Medium Access Control layer) from data input from the reception HARQ processing unit 113, and outputs the extracted control information to the MAC control unit 119. The MAC information extraction unit 115 outputs remaining data to the data processing unit 121. The data processing unit 121 has functions as the PDCP layer and the RLC layer and performs a decompression function of a compressed IP header, a decoding function of encrypted data, and processing such as segmentation and association of data. Then, the data processing unit 121 recovers data so as to have the original form. The data processing unit 121 distinguishes the RRC message and the user data. The data processing unit 121 outputs the RRC message to the RRC control unit 123 and outputs the user data to the higher layer.

The PHY control unit 117 controls the transmission processing unit 107, the radio unit 109, and the reception processing unit 111 by an instruction from the MAC control unit 119. The PHY control unit 117 notifies the transmission processing unit 107 of the modulation•coding techniques in notification from the MAC control unit 119, transmission power information, and modulation•coding techniques and a transmission location which are obtained from the transmission location information (transmission cell information). The PHY control unit 117 notifies the radio unit 109 of frequency information of a transmission cell and the transmission power information.

The MAC control unit 119 determines a data transmission destination and a priority order of data transmission based on a data transmission control configuration set from the RRC control unit 123, data amount information acquired from the transmission data storage unit 103, and uplink transmission grant information acquired from the reception processing unit 111. The MAC control unit 119 notifies the transmission data storage unit 103 of information regarding data to be transmitted. The MAC control unit 119 notifies the transmission HARQ processing unit 105 of HARQ information and outputs modulation•coding techniques and transmission location information (transmission cell information) to the PHY control unit 117.

The MAC control unit 119 acquires response information to uplink transmission data from the reception processing unit 111. The MAC control unit 119 instructs the transmission HARQ processing unit 105 and the PHY control unit 117 of retransmission in a case where the response information indicates NACK (negative response). The MAC control unit 119 instructs the PHY control unit 117 to transmit an ACK signal or a NACK signal in a case where information of success or failure in decoding processing of data is acquired from the reception HARQ processing unit 113.

The MAC control unit 119 has a function of the MAC layer. The MAC control unit 119 controls the radio unit 109 so as to control activation/deactivation control and DRX control and controls the PHY control unit 117 so as to control the transmission processing unit 107 and the reception processing unit 111 in a case where activation/deactivation instruction information and discontinuous reception (DRX) control information of a cell (or a component carrier) are acquired from MAC control information input from the MAC information extraction unit 115.

The MAC control unit 119 outputs transmission timing information in the MAC control information input from the MAC information extraction unit 115 to the PHY control unit 117. The MAC control unit 119 manages the uplink transmission timing and controls the PHY control unit 117.

The RRC control unit 123 sets various configurations for communicating with the base station device 3-1 and the base station device 3-2, such as connection•disconnection processing with the base station device 3-1, a configuration of carrier aggregation, and data transmission control configuration of the control data and the user data. The RRC control unit 123 exchanges information with the higher layer in accordance with the various configurations and controls a lower layer in accordance with the various configurations.

The RRC control unit 123 creates the RRC message and outputs the created RRC message to the data generation unit 101. The RRC control unit 123 analyzes the RRC message input from the data processing unit 121. The RRC control unit 123 creates a message indicating transmission performance of the mobile station device itself and outputs the created message to the data generation unit 101. The RRC control unit 123 outputs information necessary for the MAC layer to the MAC control unit 119 and outputs information necessary for the physical layer to the PHY control unit 117.

The transmission processing unit 107, the radio unit 109, the reception processing unit 111, and the PHY control unit 117 operate the physical layer. The transmission data storage unit 103, the transmission HARQ processing unit 105, the reception HARQ processing unit 113, the MAC information extraction unit 115, and the MAC control unit 119 operate the MAC layer. The data generation unit 101 and the data processing unit 121 operate the RLC layer and the PDCP layer. The RRC control unit 123 operates the RRC layer.

Figure 2:
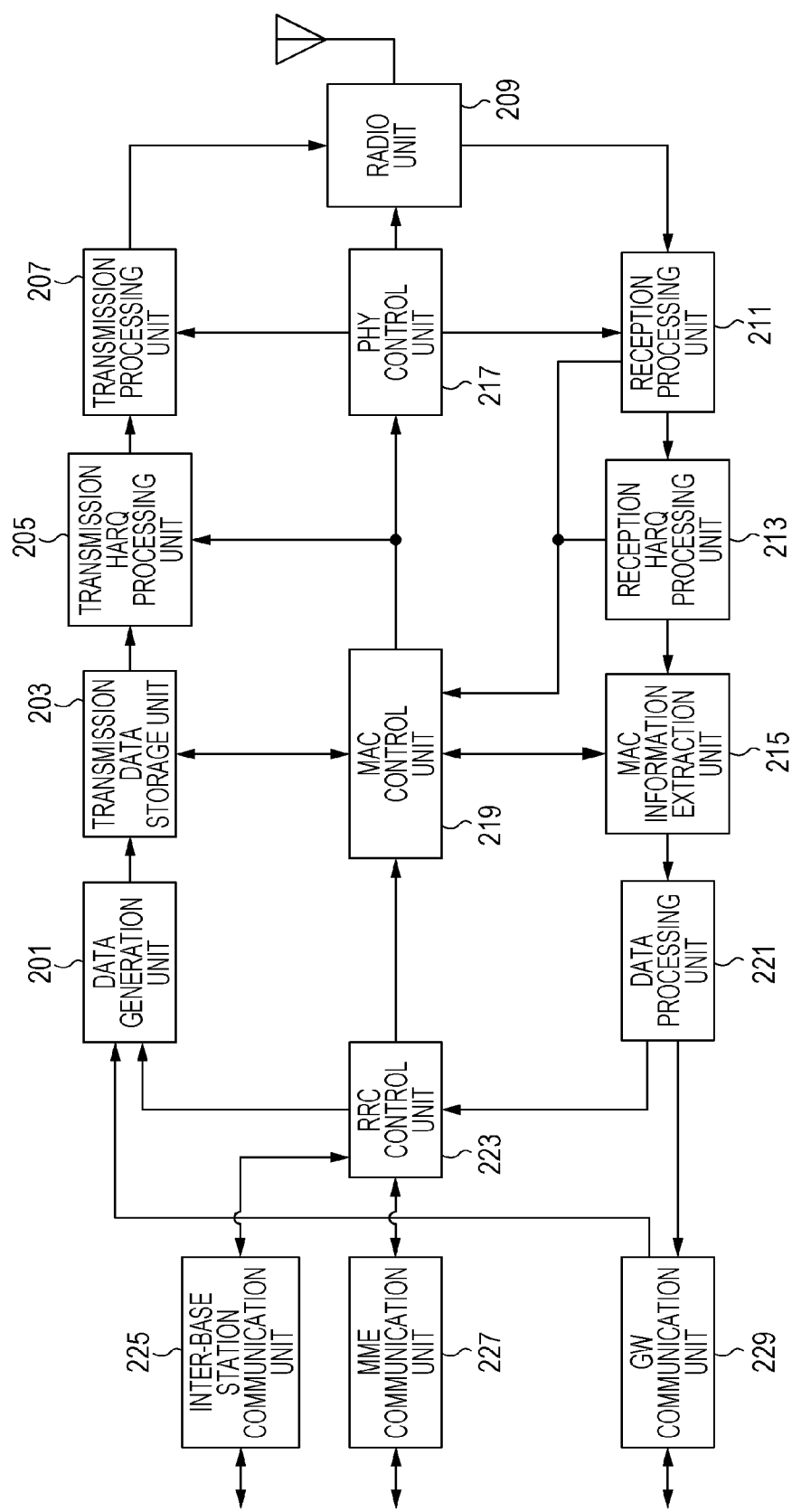
FIG. 2 is a diagram illustrating an example of a structure of a base station device according to the embodiment of the present invention.

FIG. 2 is a diagram illustrating a structure of the base station device according to the embodiment of the present invention. A data generation unit 201, a transmission data storage unit 203, a transmission HARQ processing unit 205, a transmission processing unit 207, a radio unit 209, a reception processing unit 211, a reception HARQ processing unit 213, a MAC information extraction unit 215, a PHY control unit 217, a MAC control unit 219, a data processing unit 221, a RRC control unit 223, an inter-base station communication unit 225, an MME communication unit 227, and a GW communication unit 229 constitute the base station device 3-1 or the base station device 3-2.

User data from the GW communication unit 229 and control data from the RRC control 223 are input to the data generation unit 201. The data generation unit 201 has functions as the PDCP layer and the RLC layer. The data generation unit 201 performs processing such as header compression of an IP packet of the user data, encryption of data, and segmentation and association of data. The data generation unit 201 adjusts a data size. The data generation unit 201 outputs data subjected to processing and logical channel information of the data to the transmission data storage unit 203.

The transmission data storage unit 203 accumulates pieces of data input from the data generation unit 201 for each user, and output data of a user which is instructed based on an instruction from the MAC control unit 219 and has an instructed data amount, to the transmission HARQ processing unit 205. The transmission data storage unit 203 outputs information on a data amount of accumulated pieces of data to the MAC control unit 219.

The transmission HARQ processing unit 205 codes input data and performs puncturing processing on coded data. The transmission HARQ processing unit 205 outputs punctured data to the transmission processing unit 207, and holds the coded data. The transmission HARQ processing unit 205 performs puncturing processing different from puncturing which was performed the previous time based on coded data which has been held, in a case where retransmission of data is instructed from the MAC control unit 219. The transmission HARQ processing unit 205 outputs punctured data to the transmission processing unit 207.

The transmission processing unit 207 modulates and codes data input from the transmission HARQ processing unit 205. The transmission processing unit 207 maps modulated•coded data onto signals of the physical downlink control channel PDCCH, the downlink synchronization signal, the physical broadcast channel PBCH, the physical downlink shared channel PDSCH, and the like in each cell, and each channel. The transmission processing unit 207 performs OFDM signal processing such as serial/parallel conversion, Inverse Fast Fourier Transform (IFFT), and CP insertion, on the mapped data, and thus generates an OFDM signal.

The transmission processing unit 207 outputs the generated OFDM signal to the radio unit 209. The transmission processing unit 207 generates an ACK or a NACK signal, maps the generated signal onto the physical downlink control channel (PDCCH), and outputs a result of mapping to the radio unit 209 in a case where a response instruction of reception data is received from the MAC control unit 219.

The radio unit 209 upconverts data input from the transmission processing unit 207 into a radio frequency, adjusts transmission power, and thus transmits data from a transmit antenna. The radio unit 209 downconverts a radio signal received by a receive antenna, and output the downconverted radio signal to the reception processing unit 211. The reception processing unit 211 performs Fast Fourier Transform (FFT) processing, decoding, demodulation processing, and the like on a signal input from the radio unit 209. The reception processing unit 211 outputs data of the physical uplink shared channel (PUSCH) in the demodulated data to the reception HARQ processing unit 213. The reception processing unit 211 outputs response information (ACK/NACK), downlink radio quality information (CQI), and uplink transmission request information (scheduling request) of downlink transmission data of control data which is acquired from the physical uplink control channel PUCCH in the demodulated data, to the MAC control unit 219.

The reception HARQ processing unit 213 outputs data to the MAC information extraction unit 215 in a case where decoding processing is performed on input data from the reception processing unit 211, and the decoding processing succeeds. The reception HARQ processing unit 213 holds data which fails in the decoding processing, in a case where the decoding processing on the input data fails. The reception HARQ processing unit 213 combines data which has been held and retransmission data in a case of receiving the retransmission data, and performs decoding processing on a result of combination. The reception HARQ processing unit 213 notifies the MAC control unit 219 of which the decoding processing on the input data succeeds or fails.

The MAC information extraction unit 215 extracts control data of the MAC layer from data input from the reception HARQ processing unit 213, and outputs the extracted control information to the MAC control unit 219. The MAC information extraction unit 215 outputs remaining data to the data processing unit 221. The data processing unit 221 has functions as the PDCP layer and the RLC layer, and performs a decompression function of a compressed IP header, a decoding function of encrypted data, and processing such as segmentation and association of data. Then, the data processing unit 221 recovers data so as to have the original form. The data processing unit 221 distinguishes the RRC message and the user data. The data processing unit 221 outputs the RRC message to the RRC control unit 223 and outputs the user data to the higher layer.

The MAC control unit 219 has a function of the MAC layer. The MAC control unit 219 controls the MAC layer based on information acquired from the RRC control unit 223, the lower layer, or the like. The MAC control unit 219 performs scheduling processing of the downlink and the uplink. The MAC control unit 219 performs scheduling processing of the downlink and the uplink based on response information (ACK/NACK) and downlink radio quality information (CQI) of downlink transmission data input from the reception processing unit 211, uplink transmission request information (scheduling request), control information input from the MAC information extraction unit 215, and data amount information of each user acquired from the transmission data storage unit 203. The MAC control unit 219 outputs a scheduling result to the transmission processing unit 207.

The MAC control unit 219 acquires response information to uplink transmission data from the reception processing unit 211. The MAC control unit 219 instructs the transmission HARQ processing unit 205 and the transmission processing unit 207 of retransmission in a case where the response information indicates NACK (negative response). The MAC control unit 219 instructs the transmission processing unit 207 of transmission of an ACK signal or a NACK signal in a case where information of success or failure in decoding processing of data is acquired from the reception HARQ processing unit 213.

The MAC control unit 219 performs activation/deactivation processing of a cell (or a component carrier) which is allocated to the mobile station device 1-1, management of the uplink transmission timing, or the like.

The RRC control unit 223 sets various configurations for communicating with the mobile station device 1-1, such as connection•disconnection processing with the mobile station device 1-1, a configuration of carrier aggregation, and a data transmission control configuration indicating that a cell in which the control data and the user data of the mobile station device 1-1 are transmitted and received. The RRC control unit 223 exchanges information with the higher layer in accordance with the various configurations and controls the lower layer in accordance with the various configurations.

The RRC control unit 223 creates various RRC messages and outputs the created RRC message to the data generation unit 201. The RRC control unit 223 analyzes the RRC message input from the data processing unit 221. The RRC control unit 223 performs a configuration of carrier aggregation suitable for the mobile station device 1-1 based on transmission and reception performance of the mobile station device in a case where a message indicating the transmission and reception performance of the mobile station device is acquired from the mobile station device 1-1. The RRC control unit 223 outputs information necessary for the MAC layer to the MAC control unit 219 and outputs information necessary for the physical layer to the PHY control unit 217. The RRC control unit 223 notifies the inter-base station communication unit 225 and the MME communication unit 227 of necessary information in a case where handover or dual connect is performed.

The inter-base station communication unit 225 performs a connection with the other base station device, and transmits a control message between base station devices, which is input from the RRC control unit 223 to the other base station device. The inter-base station communication unit 225 receives the control message between the base station devices from the other base station device and outputs the received control message to the RRC control unit 223. The control message between the base station devices includes a handover request message, a dual connect request message, a handover request response message, a dual connect request response message, a status transmission message, a mobile station information release message, and the like.

The MME communication unit 227 performs a connection with the MME, and transmits a control message between the base station device and the MME, which is input from the RRC control unit 223 to the MME. The MME communication unit 227 receives the control message between the base station device and the MME, and outputs the received control message to the RRC control unit 223. The control message between the base station device and the MME includes a path switch request message, a path switch request response message, and the like.

The inter-GW communication unit 229 performs a connection with a GW, receives user data of the mobile station device, which is transferred from the GW, and outputs the received data to the data generation unit 201. The inter-GW communication unit 229 transmits the user data of the mobile station device, which is input from the data processing unit 221, to the GW.

The transmission processing unit 207, the radio unit 209, and the reception processing unit 211 operate the PHY layer. The transmission data storage unit 203, the transmission HARQ processing unit 205, the reception HARQ processing unit 213, the MAC information extraction unit 215, and the MAC control unit 219 operates the MAC layer. The data generation unit 201 and the data processing unit 221 operate the RLC layer and the PDCP layer. The RRC control unit 223 operates the RRC layer.

[Description of Operation]

A wireless communication system as illustrated in FIGS. 7 to 15 is assumed. As illustrated in FIG. 7, the base station device 3-1 and a plurality of mobile station devices 1-1, 1-2, and 1-3 communicate with each other. The wireless communication system illustrated in FIG. 15 in which the base station device 3-1 of the macro cell, the base station device 3-2 of the small cell, and the mobile station device 1-1 communicate with each other through a plurality of cells is assumed.

In a case where the base station device 3-2 of the small cell is detected in communication of the base station device 3-1 and the mobile station device 1-1 of the macro cell with each other, and the mobile station device 1-1 communicates with the base station device 3-1 and the base station device 3-2 in dual connect, a configuration of the dual connect is required between the base station device 3-1 and the mobile station device 1-1 of the macro cell, and between the base station device 3-2 of the small cell and the mobile station device 1-1. A dual connect connection configuration procedure will be described below.

Figure 3:
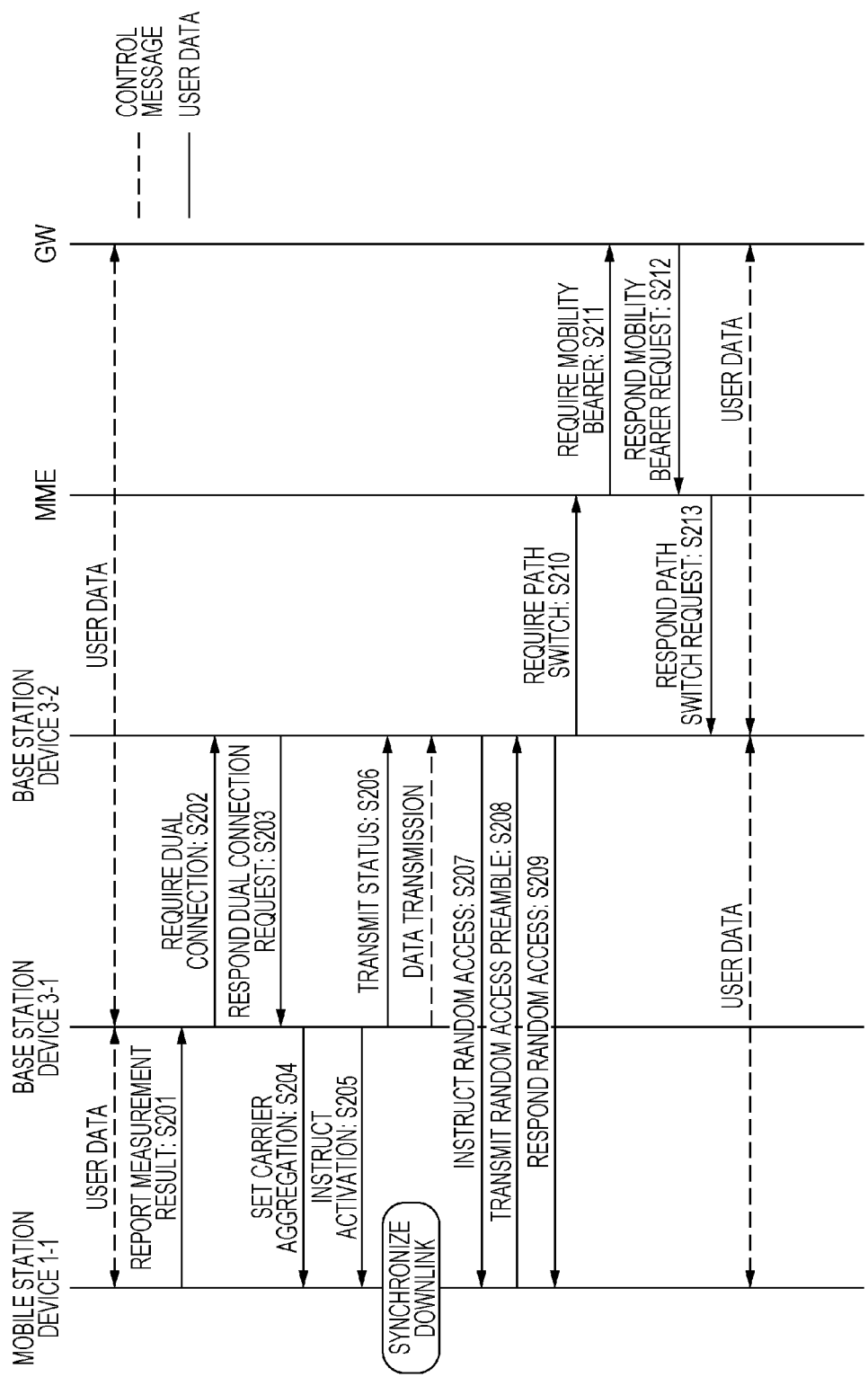
FIG. 3 is a diagram illustrating an example of a dual connect procedure.

FIG. 3 is a diagram illustrating an example of a dual connect configuration procedure according to the embodiment of the present invention.

The following descriptions will be made by using a base station device of the macro cell as the base station device 3-1, and using a base station device of the small cell as the base station device 3-2.

The mobile station device 1-1 measures radio quality of peripheral cells (peripheral frequency), and notifies the base station device 3-1 of a measurement report message including a radio quality measurement result (Step S201). The base station device 3-1 determines whether or not the dual connect with the base station device 3-2 is performed, based on the measurement result of the mobile station device 1-1. In a case where the dual connect with the base station device 3-2 is performed, the base station device 3-1 notifies the base station device 3-2 of the small cell of a dual connect request message (Step S202).

The dual connect request message includes information required for performing the dual connect on the base station device 3-2 of the small cell. The information required for performing the dual connect may include information required for the base station device 3-2 notifying the MME of a path switch request message, C-RNTI of the mobile station device 1-1, encryption key information, information required for performing transmission and reception control on user data of the mobile station device 1-1 in the base station device 3-2, and parameters of discontinuous reception.

If the base station device 3-2 of the small cell consents to the dual connect, the base station device 3-2 notifies the base station device 3-1 of the macro cell of a dual connect request response message (Step S203). The dual connect request response message includes radio parameters of the base station device 3-2 for the small cell, and information which is allocated to the mobile station device 1-1 by the base station device 3-2. The information which is allocated to the mobile station device 1-1 by the base station device 3-2 may include radio resource information of the physical uplink control channel PUCCH and radio resource information of an uplink reference signal.

The handover request message may be used instead of the dual connect request message. In this case, the handover request message additionally includes information indicating the dual connect. Similarly, the dual connect request response message may be used instead of the handover request response message and the handover request response message may additionally include information indicating the dual connect.

If the base station device 3-1 receives the dual connect request response message, the base station device 3-1 notifies the mobile station device 1-1 of a carrier aggregation configuration message (Step S204). The carrier aggregation configuration message may include the radio parameters of the base station device 3-2 for the small cell, which is included in the dual connect request response message, the information which is allocated to the mobile station device 1-1 by the base station device 3-2, and data transmission control information for instructing to transmit the user data of the mobile station device 1-1 to a cell of the base station device 3-2.

After notification of the carrier aggregation configuration message, the base station device 3-1 transmits an activation instruction message for the small cell of the base station device 3-2 to the mobile station device 1-1 (Step S205). The base station device 3-1 notifies the base station device 3-2 of a status transmission message including user data information of the mobile station device 1-1, and thus transmits the user data of the mobile station device 1-1, which has been held by the base station device 3-1, to the base station device 3-2 (Step S206).

If the mobile station device 1-1 receives the activation instruction message, the mobile station device 1-1 performs downlink synchronization processing on a cell of the base station device 3-2. The mobile station device 1-1 may perform the downlink synchronization processing after the carrier aggregation configuration message is received. After the downlink synchronization processing, the mobile station device 1-1 starts to monitor the physical downlink control channel PDCCH from the cell of the base station device 3-2. The base station device 3-2 transmits a random access instruction message to the mobile station device 1-1 in the physical downlink control channel PDCCH, after the status transmission message is received (Step S207). If the mobile station device 1-1 receives the random access instruction message, the mobile station device 1-1 transmits a random access preamble which is set in the random access instruction message, to the base station device 3-2 (Step S208).

If the base station device 3-2 receives the random access preamble transmitted from the mobile station device 1-1, the base station device 3-2 transmits the random access response message including the transmission timing information to the mobile station device 1-1 (Step S209). The base station device 3-2 enables the user data of the mobile station device 1-1, which is transmitted from the base station device 3-1, to be transmitted to the mobile station device 1-1 after the random access response message is transmitted. After the random access response message is transmitted, the base station device 3-2 notifies the mobility management entity (MME) of a path switch request message which is used for requiring to change a data path of the user data of the mobile station device 1-1 from the base station device 3-1 to the base station device 3-2 (Step S210).

If the MME receives the path switch request message, the MME notifies the GW (gateway) of a mobility bearer request message (Step S211). If the GW receives the mobility bearer request message, the GW changes the data path of the user data of the mobile station device 1-1 from the base station device 3-1 to the base station device 3-2. The GW notifies the MME of the mobility bearer request response message (Step S212). The MME notifies the base station device 3-2 of the path switch request response message (Step S213).

The path switch request message includes information indicating that the base station device 3-2 is in a state of the dual connect with the base station device 3-1, and thereby the base station device 3-2 may show that path switch request message is not used for the handover, and is used for a change request of the data path, to the MME. A new path switch request message and a new path switch request response message may be prepared for the dual connect.

In a case where the mobile station device 1-1 receives the random access response message in an uplink data transmission control operation of the mobile station device 1-1, the mobile station device 1-1 recognizes that the user data is allowed to be transmitted to the cell of the base station device 3-2. That is, after the mobile station device 1-1 receives the random access response message, the mobile station device 1-1 transmits the control data to the base station device 3-1 under transmission control for transmitting the control data and the user data to the base station device 3-1, performs a change to transmission control for transmitting the user data to the base station device 3-2, and then starts data transmission.

A trigger for switching of the data transmission control of the control data and the user data may be also performed in a case where the uplink transmission timing for the cell of the base station device 3-2, which is indicated by the random access response message, is applied to the mobile station device 1-1. The trigger for switching of the transmission control of the control data and the user data may be performed when the random access instruction message is received, or when the activation instruction message is received.

In a case where the random access preamble from the mobile station device 1-1 is not detected or received even though a predetermined period of time elapses after the base station device 3-2 transmits the random access instruction message to the mobile station device 1-1, the base station device 3-2 notifies the base station device 3-1 of abnormality of the mobile station device 1-1. That is, the base station device 3-2 notifies the base station device 3-1 that the random access preamble from the mobile station device 1-1 has not been received.

The base station device 3-2 stops a procedure for changing the data path of the user data of the mobile station device 1-1. That is, the base station device 3-2 does not transmit the path switch request message for changing the data path of the user data of the mobile station device 1-1, to the MME.

Figure 4:
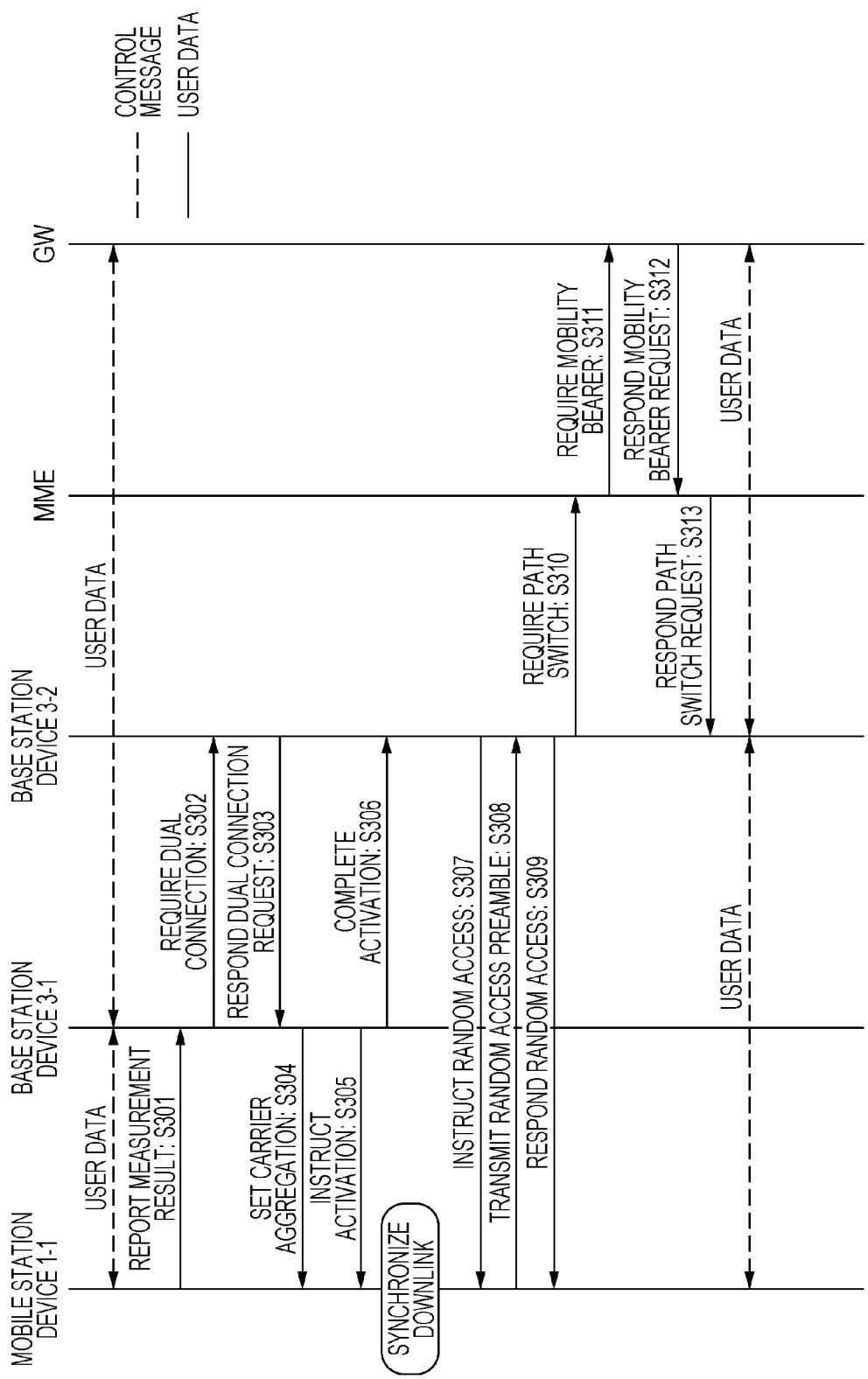
FIG. 4 is a diagram illustrating an example of the dual connect procedure.

FIG. 4 is a diagram illustrating another example of the dual connect configuration procedure according to the embodiment of the present invention. The following descriptions will be made by using a base station device of the macro cell as the base station device 3-1, and using a base station device of the small cell as the base station device 3-2.

The mobile station device 1-1 measures radio quality of peripheral cells (peripheral frequency), and notifies the base station device 3-1 of a measurement report message including a radio quality measurement result (Step S301). The base station device 3-1 determines whether or not the dual connect with the base station device 3-2 is performed, based on the measurement result of the mobile station device 1-1. In a case where the dual connect with the base station device 3-2 is performed, the base station device 3-1 notifies the base station device 3-2 of the small cell of a dual connect request message (Step S302).

The dual connect request message includes information required for performing the dual connect on the base station device 3-2 of the small cell. The information required for performing the dual connect may include information required for the base station device 3-2 notifying the MME of a path switch request message, C-RNTI of the mobile station device 1-1, encryption key information, information required for performing transmission and reception control on user data of the mobile station device 1-1 in the base station device 3-2, and parameters of discontinuous reception.

If the base station device 3-2 of the small cell consents to the dual connect, the base station device 3-2 notifies the base station device 3-1 of the macro cell of a dual connect request response message (Step 303). The dual connect request response message includes radio parameters of the base station device 3-2 for the small cell, or information which is allocated to the mobile station device 1-1 by the base station device 3-2. The information which is allocated to the mobile station device 1-1 by the base station device 3-2 may include radio resource information of the physical uplink control channel PUCCH, and radio resource information of the uplink reference signal.

The handover request message may be used instead of the dual connect request message. In this case, the handover request message additionally includes information indicating the dual connect. Similarly, the dual connect request response message may be used instead of the handover request response message, and the handover request response message may additionally include information indicating the dual connect.

If the base station device 3-1 receives the dual connect request response message, the base station device 3-1 notifies the mobile station device 1-1 of a carrier aggregation configuration message (Step S304). The carrier aggregation configuration message may include the radio parameters of the cell of the base station device 3-2, which is included in the dual connect request response message, the information which is allocated to the mobile station device 1-1 by the base station device 3-2, and information for instructing to transmit the user data of the mobile station device 1-1 to the cell of the base station device 3-2.

After notification of the carrier aggregation configuration message, the base station device 3-1 transmits the activation instruction message for the cell of the base station device 3-2 to the mobile station device 1-1 (Step S305). After the activation instruction message is transmitted, the base station device 3-1 transmits an activation completion message indicating that the mobile station device 1-1 is notified of an activation instruction for the cell of the base station device 3-2, to the base station device 3-2 (Step S306).

In this procedure, the user data which remains in the base station device 3-1 is not transmitted to the base station device 3-2, and thus data is not transmitted between the base station device 3-1 and the base station device 3-2 as possible, and load of an interface between the base station device 3-1 and the base station device 3-2 is reduced.

If the mobile station device 1-1 receives the activation instruction message, the mobile station device 1-1 performs downlink synchronization processing on the cell of the base station device 3-2. The mobile station device 1-1 may perform the downlink synchronization processing after the carrier aggregation configuration message is received. After the downlink synchronization processing, the mobile station device 1-1 starts to monitor the physical downlink control channel PDCCH from the cell of the base station device 3-2. The base station device 3-2 transmits a random access instruction message to the mobile station device 1-1 in the physical downlink control channel PDCCH, after the activation completion message is received (Step S307). If the mobile station device 1-1 receives the random access instruction message, the mobile station device 1-1 transmits a random access preamble which is set in the random access instruction message, to the base station device 3-2 (Step S308).

If the base station device 3-2 receives the random access preamble transmitted from the mobile station device 1-1, the base station device 3-2 transmits a random access response message including the transmission timing information to the mobile station device 1-1 (Step S309). The base station device 3-2 notifies the MME of a path switch request message which is used for requiring to switch a data path of the mobile station device 1-1 from the base station device 3-1 to the base station device 3-2 after the random access response message is transmitted (Step S310).

If the MME receives the path switch request message, the MME notifies the GW of a mobility bearer request message (Step S311). If the GW receives the mobility bearer request message, the GW switches the data path of the user data of the mobile station device 1-1 from the base station device 3-1 to the base station device 3-2. The GW notifies the MME of the mobility bearer request response message (Step S312). The MME notifies the base station device 3-2 of the path switch request response message (Step S313).

The path switch request message includes information indicating that the base station device 3-2 is in a state of the dual connect with the base station device 3-1, and thereby the base station device 3-2 may show that path switch request message is not used for the handover, and is used for a switching request of the data path, to the MME. A new path switch request message and a new path switch request response message may be prepared for the dual connect.

In a case where the mobile station device 1-1 receives the random access response message in the uplink data transmission control operation of the mobile station device 1-1, the mobile station device 1-1 recognizes that the user data is allowed to be transmitted to the cell of the base station device 3-2. That is, after the mobile station device 1-1 receives the random access response message, the mobile station device 1-1 transmits the control data to the base station device 3-1 under transmission control for transmitting the control data and the user data to the base station device 3-1, performs a change to transmission control for transmitting the user data to the base station device 3-2, and then starts data transmission.

A trigger for switching of the data transmission control of the control data and the user data may be also performed in a case where the uplink transmission timing for the cell of the base station device 3-2, which is indicated by the random access response message, is applied to the mobile station device 1-1. The trigger for switching of the data transmission control of the control data and the user data may be performed when the random access instruction message is received, or when the activation instruction message is received.

In a case where the random access preamble from the mobile station device 1-1 is not detected or received even though a predetermined period of time elapses after the base station device 3-2 transmits the random access instruction message to the mobile station device 1-1, the base station device 3-2 notifies the base station device 3-1 of abnormality of the mobile station device 1-1. That is, the base station device 3-2 notifies the base station device 3-1 that the random access preamble from the mobile station device 1-1 has not been received. The base station device 3-2 stops a procedure for switching the data path of the user data of the mobile station device 1-1. That is, the base station device 3-2 does not transmit the path switch request message for switching the data path of the user data of the mobile station device 1-1, to the MME.

Figure 5:
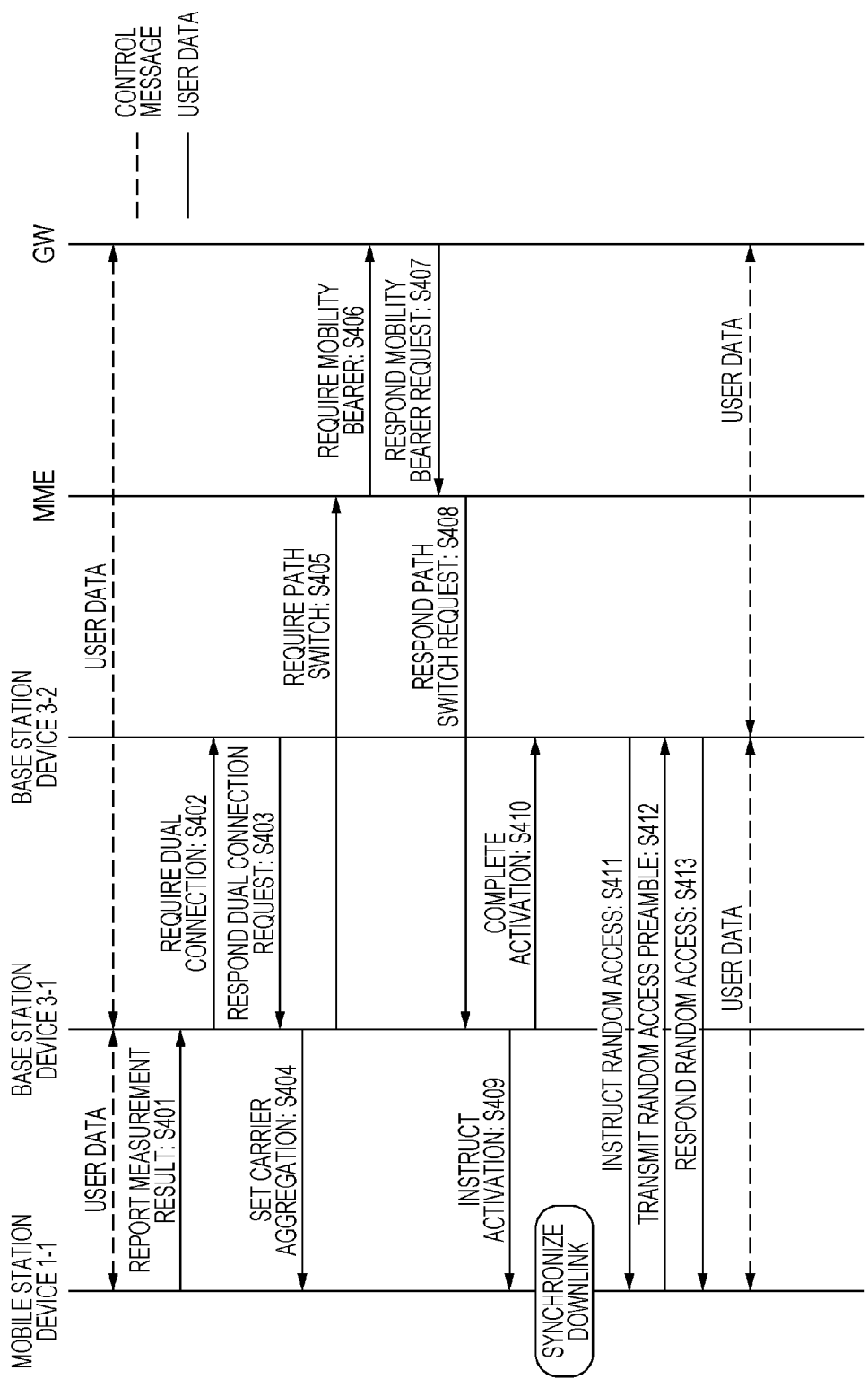
FIG. 5 is a diagram illustrating an example of the dual connect procedure.

FIG. 5 is a diagram illustrating yet another example of the dual connect configuration procedure according to the embodiment of the present invention. The following descriptions will be made by using a base station device of the macro cell as the base station device 3-1, and using a base station device of the small cell as the base station device 3-2.

The mobile station device 1-1 measures radio quality of peripheral cells (peripheral frequency), and notifies the base station device 3-1 of a measurement report message including a radio quality measurement result (Step S401). The base station device 3-1 determines whether or not the dual connect with the base station device 3-2 is performed, based on the measurement result of the mobile station device 1-1. In a case where the dual connect with the base station device 3-2 is performed, the base station device 3-1 notifies the base station device 3-2 of the small cell of a dual connect request message (Step S402).

The dual connect request message includes information required for performing the dual connect on the base station device 3-2 of the small cell. The information required for performing the dual connect may include information required for the base station device 3-2 notifying the MME of a path switch request message, C-RNTI of the mobile station device 1-1, encryption key information, information required for performing transmission and reception control on user data of the mobile station device 1-1 in the base station device 3-2, and parameters of discontinuous reception.

If the base station device 3-2 of the small cell consents to the dual connect, the base station device 3-2 notifies the base station device 3-1 of the macro cell of a dual connect request response message (Step S403). The dual connect request response message includes radio parameters of the cell of the base station device 3-2, and information which is allocated to the mobile station device 1-1 by the base station device 3-2. The information which is allocated to the mobile station device 1-1 by the base station device 3-2 may include radio resource information of the physical uplink control channel PUCCH and radio resource information of an uplink reference signal.

The handover request message may be used instead of the dual connect request message. In this case, the handover request message additionally includes information indicating the dual connect. Similarly, the dual connect request response message may be used instead of the handover request response message, and the handover request response message may additionally include information indicating the dual connect.

If the base station device 3-1 receives the dual connect request response message, the base station device 3-1 notifies the mobile station device 1-1 of a carrier aggregation configuration message (Step S404). The carrier aggregation configuration message may include the radio parameters of the cell of the base station device 3-2, which is included in the dual connect request response message, the information which is allocated to the mobile station device 1-1 by the base station device 3-2, and information for instructing to transmit the user data of the mobile station device 1-1 to a cell of the base station device 3-2.

After notification of the carrier aggregation configuration message, the random access response message is transmitted, and then the base station device 3-1 notifies the MME of a path switch request message which is used for requiring to switch a data path of the mobile station device 1-1 from the base station device 3-1 to the base station device 3-2 after the (Step S405).

If the MME receives the path switch request message, the MME notifies the GW of a mobility bearer request message (Step S406). If the GW receives the mobility bearer request message, the GW switches the data path of the user data of the mobile station device 1-1 from the base station device 3-1 to the base station device 3-2. The GW notifies the MME of the mobility bearer request response message (Step S407). The MME notifies the base station device 3-2 of the path switch request response message (Step S408).

The path switch request message includes information indicating that the base station device 3-2 is in a state of the dual connect with the base station device 3-1, and thereby the base station device 3-2 may show that path switch request message is not used for the handover, and is used for a switching request of the data path, to the MME. A new path switch request message and a new path switch request response message may be prepared for the dual connect.

In this procedure, the base station device 3-1 performs a path switch request to the GW, and thus an amount of data transmitted by the dual connect request message is reduced, and a status transmission message is reduced. Data is not transmitted between the base station device 3-1 and the base station device 3-2 as possible and thus load of the interface between the base station device 3-1 and the base station device 3-2 is reduced.

If the base station device 3-1 receives the path switch request response message, the base station device 3-1 transmits an activation instruction message for the cell of the base station device 3-2 to the mobile station device 1-1 (Step S409). After the activation instruction message is transmitted, the base station device 3-1 transmits an activation completion message indicating that the mobile station device 1-1 is notified of an activation instruction for the cell of the base station device 3-2, to the base station device 3-2 (Step S410).

If the mobile station device 1-1 receives the activation instruction message, the mobile station device 1-1 performs downlink synchronization processing on the cell of the base station device 3-2. The mobile station device 1-1 may perform the downlink synchronization processing after the carrier aggregation configuration message is received. After the downlink synchronization processing, the mobile station device 1-1 starts to monitor the physical downlink control channel PDCCH from the cell of the base station device 3-2. The base station device 3-2 transmits a random access instruction message to the mobile station device 1-1 in the physical downlink control channel PDCCH, after the activation completion message is received (Step S411). If the mobile station device 1-1 receives the random access instruction message, the mobile station device 1-1 transmits a random access preamble which is set in the random access instruction message, to the base station device 3-2 (Step S412).

If the base station device 3-2 receives the random access preamble transmitted from the mobile station device 1-1, the base station device 3-2 transmits a random access response message including the transmission timing information to the mobile station device 1-1 (Step S413).

In a case where the mobile station device 1-1 receives the random access response message in the uplink data transmission control operation of the mobile station device 1-1, the mobile station device 1-1 recognizes that the user data is allowed to be transmitted to the cell of the base station device 3-2. That is, after the mobile station device 1-1 receives the random access response message, the mobile station device 1-1 transmits the control data to the base station device 3-1 under transmission control for transmitting the control data and the user data to the base station device 3-1, and performs a change to transmission control for transmitting the user data to the base station device 3-2.

A trigger for switching of the data transmission control of the control data and the user data may be also performed in a case where the uplink transmission timing for the cell of the base station device 3-2, which is indicated by the random access response message, is applied to the mobile station device 1-1. The trigger for switching of the data transmission control of the control data and the user data may be performed when the random access instruction message is received, or when the activation instruction message is received.

In a case where the random access preamble from the mobile station device 1-1 is not detected or received even though a predetermined period of time elapses after the base station device 3-2 transmits the random access instruction message to the mobile station device 1-1, the base station device 3-2 notifies the base station device 3-1 of abnormality of the mobile station device 1-1. That is, the base station device 3-2 notifies the base station device 3-1 that the random access preamble from the mobile station device 1-1 has not been received.

Figure 6:
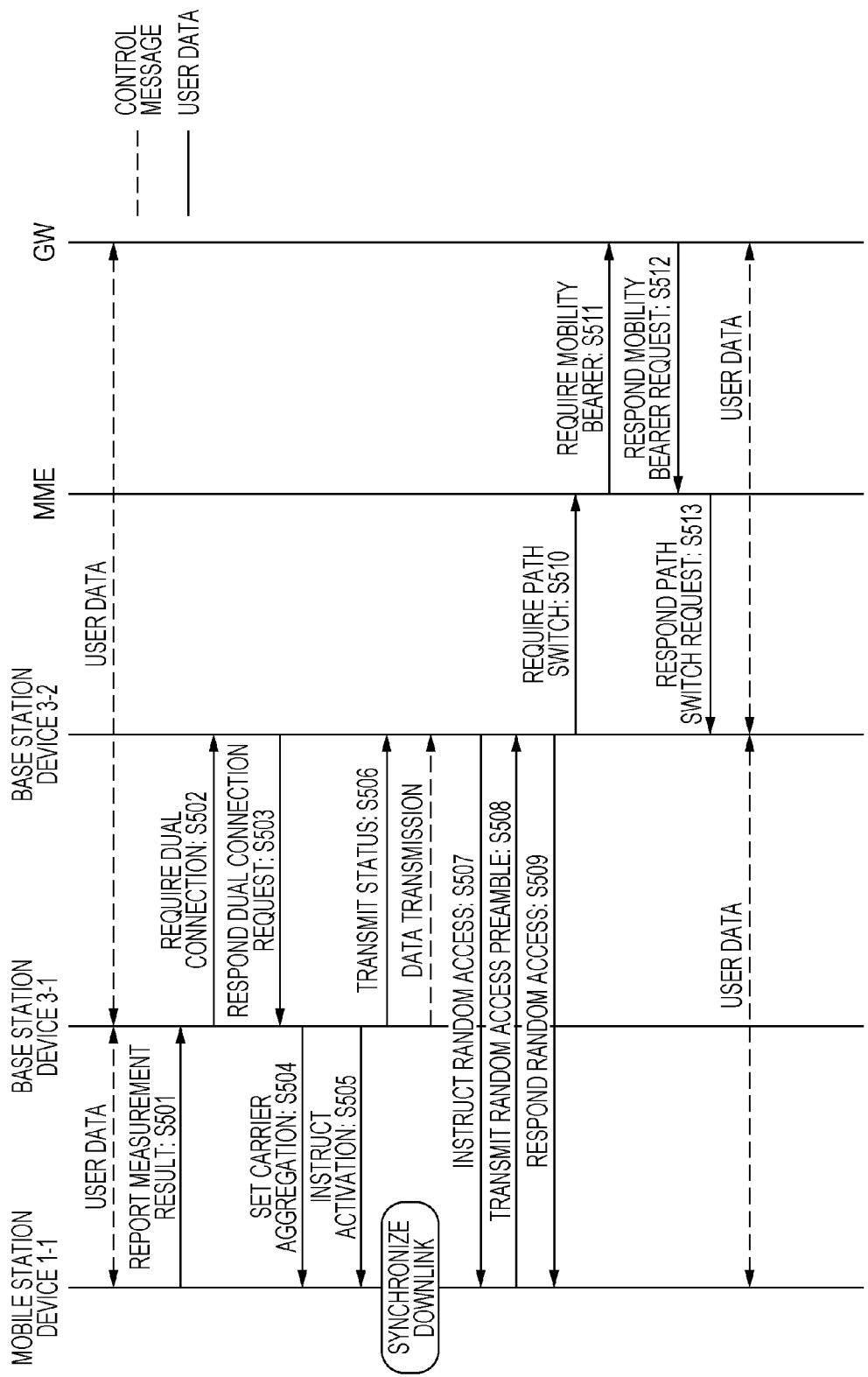
FIG. 6 is a diagram illustrating an example of the dual connect procedure.

FIG. 6 is a diagram illustrating yet another example of the dual connect configuration procedure according to the embodiment of the present invention. The following descriptions will be made by using a base station device of the macro cell as the base station device 3-1, and using a base station device of the small cell as the base station device 3-2.

The mobile station device 1-1 measures radio quality of peripheral cells (peripheral frequency), and notifies the base station device 3-1 of a measurement report message including a radio quality measurement result (Step S501). The base station device 3-1 determines whether or not the dual connect with the base station device 3-2 is performed, based on the measurement result of the mobile station device 1-1. In a case where the dual connect with the base station device 3-2 is performed, the base station device 3-1 determines whether or not a data path of the user data between the base station device 3-1 and the GW is changed to a data path of the user data between the base station device 3-2 and the GW. The base station device 3-1 notifies the base station device 3-2 of the small cell of the dual connect request message (Step S502).

The dual connect request message includes information required for performing the dual connect on the base station device 3-2 of the small cell. The information required for performing the dual connect includes change-or-not information of the data path of the user data between the base station device and the GW, information required for the base station device 3-2 notifying the MME of a path switch request message, C-RNTI of the mobile station device 1-1, encryption key information, information required for performing transmission and reception control on user data of the mobile station device 1-1 in the base station device 3-2, and parameters of discontinuous reception. Notification of information required for notifying the path switch request message may not be performed in a case where a path of the user data is not changed.

If the base station device 3-2 of the small cell consents to the dual connect, the base station device 3-2 notifies the base station device 3-1 of the macro cell of a dual connect request response message (Step S503). The dual connect request response message includes radio parameters of the small cell of the base station device 3-2, and information which is allocated to the mobile station device 1-1 by the base station device 3-2. The information which is allocated to the mobile station device 1-1 by the base station device 3-2 may include radio resource information of the physical uplink control channel PUCCH and radio resource information of an uplink reference signal.

The handover request message may be used instead of the dual connect request message. In this case, the handover request message additionally includes information indicating the dual connect. Similarly, the handover request response message may be used instead of the dual connect request response message, and the handover request response message may additionally include information indicating the dual connect.

If the base station device 3-1 receives the dual connect request response message, the base station device 3-1 notifies the mobile station device 1-1 of a carrier aggregation configuration message (Step S504). The carrier aggregation configuration message may include the radio parameters of the base station device 3-2 for the small cell, which is included in the dual connect request response message, the information which is allocated to the mobile station device 1-1 by the base station device 3-2, and information for instructing to transmit the user data of the mobile station device 1-1 to a cell of the base station device 3-2.

After notification of the carrier aggregation configuration message, the base station device 3-1 transmits an activation instruction message for the small cell of the base station device 3-2 to the mobile station device 1-1 (Step S505). The base station device 3-1 notifies the base station device 3-2 of a status transmission message including user data information of the mobile station device 1-1 (Step S506). Thus, the base station device 3-1 transmits the user data of the mobile station device 1-1, which has been held by the base station device 3-1, to the base station device 3-2.

In a case where it is instructed that the data path is not changed, through the change-or-not information of the data path of the user data between the base station device and the GW, which is proposed to the base station device 3-2, the base station device 3-1 continues to transmit the user data received from the GW. The base station device 3-1 transmits the user data of the mobile station device 1-1 which is transmitted from the base station device 3-2, to the GW.

If the mobile station device 1-1 receives the activation instruction message, the mobile station device 1-1 performs downlink synchronization processing on the cell of the base station device 3-2. After the downlink synchronization processing, the mobile station device 1-1 starts to monitor the physical downlink control channel PDCCH from the cell of the base station device 3-2. The base station device 3-2 transmits a random access instruction message to the mobile station device 1-1 in the physical downlink control channel PDCCH, after the activation completion message is received (Step S507). If the mobile station device 1-1 receives the random access instruction message, the mobile station device 1-1 transmits a random access preamble which is set in the random access instruction message, to the base station device 3-2 (Step S508).

If the base station device 3-2 receives the random access preamble transmitted from the mobile station device 1-1, the base station device 3-2 transmits a random access response message including the transmission timing information to the mobile station device 1-1 (Step S509). The base station device 3-2 enables the user data of the mobile station device 1-1 which is transmitted from the base station device 3-1 to be transmitted to the mobile station device 1-1, after the random access response message is transmitted.

In a case where it is instructed that the data path has been changed, through the change-or-not information of the data path of the user data between the base station device and the GW, the base station device 3-2 notifies the MME of a path switch request message which is used for requiring to change a data path of the mobile station device 1-1 from the base station device 3-1 to the base station device 3-2, after the random access response message is transmitted (Step S510). In a case where the data path of the user data is not changed, the base station device 3-2 transmits data which is transmitted from the base station device 3-1, to the mobile station device 1-1 after the status transmission message is transmitted. The base station device 3-2 transmits data which is transmitted from the mobile station device 1-1, to the base station device 3-1.

If the MME receives the path switch request message, the MME notifies the GW of a mobility bearer request message (Step S511). If the GW receives the mobility bearer request message, the GW changes the data path of the user data of the mobile station device 1-1 from the base station device 3-1 to the base station device 3-2. The GW notifies the MME of the mobility bearer request response message (Step S512). The MME notifies the base station device 3-2 of the path switch request response message (Step S513).

The path switch request message includes information indicating that the base station device 3-2 is in a state of the dual connect with the base station device 3-1, and thereby the base station device 3-2 may show that path switch request message is not used for the handover, and is used for a change request of the data path, to the MME. A new path switch request message and a new path switch request response message may be prepared for the dual connect.

In a case where the mobile station device 1-1 receives the random access response message in the uplink data transmission control operation of the mobile station device 1-1, the mobile station device 1-1 recognizes that the user data is allowed to be transmitted to the cell of the base station device 3-2. That is, after the mobile station device 1-1 receives the random access response message, the mobile station device 1-1 transmits the control data to the base station device 3-1 under transmission control for transmitting the control data and the user data to the base station device 3-1, and performs switching to transmission control for transmitting the user data to the base station device 3-2.

A trigger for switching of the data transmission control of the control data and the user data may be also performed in a case where the uplink transmission timing for the cell of the base station device 3-2, which is indicated by the random access response message, is applied to the mobile station device 1-1. The trigger for switching of the data transmission control of the control data and the user data may be performed when the random access instruction message is received, or when the activation instruction message is received.

In a case where the random access preamble from the mobile station device 1-1 is not detected or received even though a predetermined period of time elapses after the base station device 3-2 transmits the random access instruction message to the mobile station device 1-1, the base station device 3-2 notifies the base station device 3-1 of abnormality of the mobile station device 1-1. That is, the base station device 3-2 notifies the base station device 3-1 that the random access preamble from the mobile station device 1-1 is not received. The base station device 3-2 stops a procedure for changing the data path of the user data of the mobile station device 1-1. That is, the base station device 3-2 does not transmit the path switch request message for changing the data path of the user data of the mobile station device 1-1, to the MME.

In the above-described example, an example in which the control data is transmitted and received between the base station device 3-1 of the macro cell and the mobile station device 1-1, and the user data is transmitted and received between the base station device 3-2 of the small cell and the mobile station device 1-1 is described. However, a structure in which the control data and the user data are transmitted and received between the base station device 3-1 of the macro cell and the mobile station device 1-1, and the user data is transmitted and received between the base station device 3-2 of the small cell and the mobile station device 1-1 may be made. In addition, a structure in which the control data and the user data are transmitted and received between the base station device 3-1 of the macro cell and the mobile station device 1-1, and the control data and the user data are transmitted and received between the base station device 3-2 of the small cell and the mobile station device 1-1 may be made.

In this case, the base station device 3-1 of the macro cell notifies the base station device 3-2 of the small cell of information (for example, QoS, logical channel, and the like) on data which is transmitted and received by the base station device 3-2 of the small cell. The base station device 3-1 of the macro cell causes the carrier aggregation configuration message to include information (for example, QoS, logical channel, radio bearer, or the like) on data which is transmitted and received by the base station device 3-2 of the small cell, and notifies the mobile station device 1-1 of the carrier aggregation configuration message.

In a case where the data path is not changed, the base station device 3-1 of the macro cell transmits the control data or the user data which is to be transmitted to the mobile station device 1-1 from the base station device 3-2 of the small cell, to the base station device 3-2 of the small cell. In a case where the data path has been changed, the base station device 3-2 of the small cell transmits the path switch request message for changing a path of data which is set from the base station device 3-1 of the macro cell, to the MME.

Hitherto, the embodiment of the invention is described in detail with reference to the drawings. However, a specific structure is not limited to the above descriptions and various design changes and the like may be made in a range without departing from a gist of the invention.

In this embodiment, the mobile station device is described as a terminal device or a communication device. However, this application invention is not limited thereto and may be applied to a terminal device or a communication device such as an installation type electronic device which is installed in the outside or the inside of a building, or a non-movable type electronic device, for example, an AV device, a kitchen appliance, a cleaning•washing device, an air conditioner, a vending machine, other household appliances.

For convenience of the descriptions, the mobile station device 1-1, the base station device 3-1, and the base station device 3-2 according to the embodiment are described using functional block diagrams. However, a program for implementing functions of each component of the mobile station device 1-1, the base station device 3-1, and the base station device 3-2 or some of the functions may be recorded in a computer readable recording medium and the program recorded in the recording medium may be read and executed by a computer system. Thus, the mobile station device or the base station device may be controlled. The "computer system" referred herein includes an OS or hardware such as a peripheral device.

The "computer readable recording medium" refers to a portable medium such as a flexible disk, a magneto-optical disk, a ROM, and a CD-ROM, and a storage device such as a hard disk, which is mounted in the computer system. The "computer readable recording medium" includes a medium which dynamically holds a program for a short period of time, like a communication line in a case where the program is transmitted through the communication line such as a network (for example, the Internet) and a telecommunication line, and a medium which holds the program for a constant period of time, like a volatile memory in a computer system which is a server or a client in that case. The above program may be used for implementing some of the above-described functions. The above-described functions may be combined with a program which is already recorded in the computer system, and thus a result of combination may be implemented.

Each of functional blocks used in the above embodiment may be realized as an LSI which is a typical integrated circuit. Each of the functional blocks may be individually chipped. Some or all of the functional blocks may be integrated and chipped. A method of manufacturing an integrated circuit is not limited to an LSI and may be realized by using dedicated circuits or general processors. If a technology of manufacturing an integrated circuit, which is substituted with the LSI appears by progress of a semiconductor technology, an integrated circuit may be used by using this technology.

Hitherto, the embodiment of this invention is described in detail with reference to the drawings. However, a specific structure is not limited to this embodiment and designs in a range without departing from a gist of the invention are included in a scope of claims.

INDUSTRIAL APPLICABILITY

An aspect of the present invention may be applied to a wireless communication system, a base station device, a terminal device, a wireless communication method, an integrated circuit, and the like in which efficient switching of data transmission and reception control is required.

DESCRIPTION OF REFERENCE NUMERALS 1-1 to 1-3 MOBILE STATION DEVICE
3-1, 3-2 BASE STATION DEVICE
101, 201 DATA GENERATION UNIT
103, 203 TRANSMISSION DATA STORAGE UNIT
105, 205 TRANSMISSION HARQ PROCESSING UNIT
107, 207 TRANSMISSION PROCESSING UNIT
109, 209 RADIO UNIT
111, 211 RECEPTION PROCESSING UNIT
113, 213 RECEPTION HARQ PROCESSING UNIT
115, 215 MAC INFORMATION EXTRACTION UNIT
117, 217 PHY CONTROL UNIT
119, 219 MAC CONTROL UNIT
121, 221 DATA PROCESSING UNIT
123, 223 RRC CONTROL UNIT
225 INTER-BASE STATION COMMUNICATION UNIT
227 MME COMMUNICATION UNIT
229 GW COMMUNICATION UNIT

The invention claimed is:

1. A wireless communication system, comprising:
a first base station device and a second base station device which communicate with a terminal device through a first cell and a second cell, respectively, wherein
the first base station transmits, to the second base station of the second cell which is to be added, a first request message including information regarding a change of data path for a portion of user data in the terminal device,
the second base station device changes the data path for the portion of the user data in of the terminal device, based on the information regarding the change of the data path, and
a second request message for the change of the data path is communicated by the first base station device.

2. The wireless communication system according to claim 1, wherein
the second base station device does not change the data path in a case where a random access preamble transmitted from the terminal device is not received.

3. The wireless communication system according to claim 1, wherein the first request message includes a discontinuous reception parameter.

4. A first base station device that communicates with a terminal device, the first base station comprising:
radio circuitry and an associated memory, wherein
the radio circuitry:
transmits, to a second base station device of a cell which is to be added, a first request message including information regarding a change of data path for a portion of user data in the terminal device,
receives, from the second base station device of the cell which is to be added, a request response message which is a response to the first request message, and transmits, to the terminal device, a configuration message including information regarding data transmission control of the cell which is to be added, and a second request message for the change of the data path is communicated by the first base station device.

5. A terminal device that communicates with a first base station device and a second base station device through a first cell and a second cell, the terminal device comprising:

radio circuitry, data transmission control circuitry, and an associated memory, wherein the radio circuitry:

receives a configuration message from the first base station device, the configuration message including information regarding data transmission control of the second cell which is to be added, and transmits a random access preamble to the second base station device after the configuration message is received, the data transmission control circuitry starts data transmission control based on the information regarding the data transmission control in a case where a random access response message which is a response to the random access preamble is received from the second base station device, and a request message for a change of data path for a portion of user data in the terminal device is communicated by the first base station device.

* * * * *